(12) United States Patent
Kondo et al.

(10) Patent No.: US 7,740,557 B2
(45) Date of Patent: Jun. 22, 2010

(54) HYDRAULIC CONTROL APPARATUS AND HYDRAULIC CONTROL METHOD FOR AUTOMATIC TRANSMISSION

(75) Inventors: Tomohiro Kondo, Nissin (JP); Masami Kondo, Auderghem (BE); Toshimitsu Sato, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 12/530,511

(22) PCT Filed: Mar. 13, 2008

(86) PCT No.: PCT/IB2008/001411

§ 371 (c)(1),
(2), (4) Date: Sep. 9, 2009

(87) PCT Pub. No.: WO2008/110936

PCT Pub. Date: Sep. 18, 2008

(65) Prior Publication Data

US 2010/0105521 A1  Apr. 29, 2010

(30) Foreign Application Priority Data

Mar. 14, 2007 (JP) ............................. 2007-065200

(51) Int. Cl.
*F16H 61/40* (2006.01)
*F16H 31/00* (2006.01)

(52) U.S. Cl. ............................. 477/69; 477/68; 701/55; 475/121; 475/127

(58) Field of Classification Search ................... 477/68, 477/69, 53; 701/55, 56, 64; 475/121, 127
See application file for complete search history.

(56) References Cited

U.S. PATENT DOCUMENTS

| 6,102,830 | A | 8/2000 | Tsutsui et al. | |
| 6,623,404 | B2 * | 9/2003 | Saito | 477/143 |
| 7,549,946 | B2 * | 6/2009 | Ayabe et al. | 477/107 |
| 7,563,189 | B2 * | 7/2009 | Inuta | 475/116 |

FOREIGN PATENT DOCUMENTS

| JP | 05-322022 A | 12/1993 |
| JP | 09-273627 A | 10/1997 |
| JP | 10-103494 A | 4/1998 |
| JP | 10-110816 A | 4/1998 |
| JP | 2917601 A | 4/1999 |
| JP | 11-257482 A | 9/1999 |
| JP | 2001-124194 A | 5/2001 |
| JP | 2005-344773 A | 12/2005 |
| JP | 2006-083970 A | 3/2006 |
| JP | 2007138901 A * | 6/2007 |

* cited by examiner

*Primary Examiner*—Tisha D Lewis
(74) *Attorney, Agent, or Firm*—Sughrue Mion, PLLC

(57) ABSTRACT

A hydraulic control apparatus of an automatic transmission estimates the possibility of there being a demand for a shift into a gear lower than the current gear during a power-off downshift operation. If there is a possibility that there will be a demand for a shift into the next gear during the shift, the hydraulic control apparatus starts an operation for supplying an apply preparation hydraulic pressure in preparation for the shift into that next gear.

19 Claims, 12 Drawing Sheets

FIG.6

|  | C1 | C2 | C3 | C4 | B1 | B2 | F |
|---|---|---|---|---|---|---|---|
| P | × | × | × | × | × | × | × |
| R | × | × | × | ○ | × | ○ | × |
| N | × | × | × | × | × | × | × |
| 1st | ○ | × | × | × | × | ◎ | △ |
| 2nd | ○ | × | × | × | ○ | × | × |
| 3rd | ○ | × | ○ | × | × | × | × |
| 4th | ○ | × | × | ○ | × | × | × |
| 5th | ○ | ○ | × | × | × | × | × |
| 6th | × | ○ | × | ○ | × | × | × |
| 7th | × | ○ | ○ | × | × | × | × |
| 8th | × | ○ | × | × | ○ | × | × |

HYDRAULIC CONTROL APPARATUS AND HYDRAULIC CONTROL METHOD FOR AUTOMATIC TRANSMISSION

BACKGROUND OF THE INVENTION

1. Field of the Invention

The invention relates to a hydraulic control apparatus for performing shift control in an automatic transmission provided in a vehicle or the like. More particularly, the invention relates to a hydraulic control apparatus and a hydraulic control method for an automatic transmission, which suppresses shift shock when a shift operation is performed in the transmission.

2. Description of the Related Art

One type of known transmission that transmits torque and rotation speed generated by the engine to the driving wheels appropriately according to the running state of the vehicle is an automatic transmission which automatically establishes the optimum gear ratio between the engine and the driving wheels.

Two examples of such known automatic transmissions that are used in vehicles are planetary gear type transmissions that establish a gear (hereinafter also referred to as "speed") using a planetary gear set together with clutches and brakes, and belt-type continuously variable transmissions (CVT) that adjust the gear ratio continuously (i.e., in a stepless manner).

In a vehicle provided with a planetary gear type automatic transmission, a shift map having shift lines (i.e., gear shift lines) for establishing the optimum gear according to vehicle speed and accelerator operation amount (or throttle opening amount) is stored in an ECU (Electronic Control Unit) or the like. The ECU calculates a target gear based on the vehicle speed and the accelerator operation amount referencing the shift map, and automatically shifts gears (i.e., speeds) by selectively applying and releasing the clutches and brakes, which are friction apply elements, in a predetermined combination to establish that target gear.

Also, a vehicle provided with this kind of automatic transmission has a shift lever which is operated by a driver. Operating this shift lever enables the automatic transmission to be switched between various ranges or modes, such as a P-range (parking range), an R-range (reverse running range), an N-range (a neutral range), and a D-range (forward running range or drive range). Moreover, in recent years, automatic transmissions with a manual shift function (so-called automatic transmissions with a sequential mode or sequential mode automatic transmissions) have also come into practical use. These transmissions also enable the driver to change gears in the transmission at will by operating the shift lever.

Also, among these kinds of transmissions there are some which perform a so-called coast downshift in which the transmission downshifts according to a preset shift condition with the vehicle speed as a parameter when decelerating while the accelerator is off. The shift control apparatus described in Japanese Patent No. 2917601 is one such example. This shift control apparatus shortens the shift time by performing a "skip shift" in which it downshifts by skipping over a gear or gears when a multiple gear downshift (i.e., a downshift through multiple gears) is necessary, i.e., when a shift into a gear that is two or more gears lower than the current gear (i.e., into a gear with a larger gear ratio) is necessary, when the vehicle is decelerating.

However, depending on the type of downshift, when this skip shift is performed, the release and apply timing of the friction apply elements (i.e., clutches and brakes) of the automatic transmission may be off (i.e., an apply operation or the like may end up being performed before the torque capacity is obtained in the apply-side friction apply element), and as a result, the engine may race and there may be a loss of torque, and shift shock may result.

To avoid this problem, it is desirable to perform a multiple downshift operation, i.e., a downshift operation through multiple gears, by repeatedly downshifting one gear at a time (i.e., an operation referred to as "sequential shifting") as described in Japanese Patent Application Publication No. 2005-344773 (JP-A-2005-344773).

However, in transmissions that perform this kind of sequential shifting, there is a possibility that the gear suitable for the vehicle speed may not be able to be established in cases such as when the vehicle is decelerating relatively quickly, for example, because the total shift time increases.

More specifically, the shift timing of the downshift in a power-off state (i.e., when the engine is being driven by the driving wheels) is typically set with only the vehicle speed as the parameter, as described above.

Therefore, for example, when a shift signal for a shift into 4th gear has been output based on a shift map but the vehicle has already decelerated below the vehicle speed corresponding to 4th gear in the transmission, the 4→3 shift line on the shift map is crossed such that a shift signal for a shift into 3rd gear is output. At this time, a shift operation is started by the clutches and brakes starting to be released and applied (i.e., by the start of a clutch-to-clutch shift operation) so that 3rd gear will be established in the transmission.

In this case, if the vehicle continues to decelerate relatively rapidly, the 3→2 shift line on the shift map will be crossed before the shift operation into 3rd gear is complete (i.e., while the clutches and brakes are in the middle of being released and applied) such that a shift command for a shift into 2nd gear will be output. Incidentally, because the shift operation into 3rd gear in the transmission is not yet complete, the shift operation into 2nd gear (i.e., the release and apply operations of the clutches and brakes to establish 2nd gear) must wait to be performed until the shift operation into 3rd gear is complete. That is, a shift operation is performed into a higher gear (i.e., a gear with a lower gear ratio) than the gear that is appropriate for the vehicle speed.

In such a situation, the turbine speed (i.e., the input rotation speed of the transmission) is low as a result of the falling vehicle speed so an increased amount of torque multiplication is being produced by the torque converter. During the shift operation into 2nd gear after the shift operation into 3rd gear is complete, the turbine speed increases (races), and it is at this time that the apply operation of the clutches and brakes to establish 2nd gear would be performed. As a result, a phenomenon similar to that of a so-called power-on downshift may occur which produces shift shock that pulls the vehicle forward. In this way, the sequential shifting of the related art leads to a delay of a shift operation into the appropriate gear, as well as a deterioration in drivability from shift shock. These kinds of problems become more evident as the number of gears (i.e., speeds) in automatic transmissions increases. In particular, automatic transmissions in recent years are being made to have more and more gears (i.e., speeds), which makes them increasingly susceptible to these kinds of problems.

Even if an automatic transmission shifts into a lower gear in response to an operation of the shift lever while the vehicle is decelerating (i.e., even if there is a downshift operation in the sequential mode), the foregoing problems when the gear appropriate for the vehicle speed is unable to be established may still occur, just as described above.

Incidentally, the problems with a transmission that performs sequential shifting are not limited to a case in which a shift command to shift into the next gear is output while a shift operation such as that described above is being performed. That is, those problems may also occur with the shift timing (i.e., the timing at which there is a shift demand when a shift operation is not being performed) when the vehicle is in the power-off state (i.e., when the engine is being driven by the driving wheels) and the vehicle is decelerating relatively rapidly.

SUMMARY OF THE INVENTION

This invention provides a hydraulic control apparatus and control method for an automatic transmission, which suppresses shift shock when the transmission shifted while the vehicle speed is decreasing.

A first aspect of the invention relates to a hydraulic control apparatus of an automatic transmission which is provided with a plurality of friction apply elements and in which a gear ratio is established by selectively applying the plurality of friction apply elements by controlling hydraulic pressure with respect to the plurality of friction apply elements. This hydraulic control apparatus includes next-shift preparing means for, when, during a shift operation in the automatic transmission during a power-off downshift, a shift condition for shifting into a second predetermined gear which has a larger gear ratio than a first predetermined gear that is to be established by that shift operation is satisfied, starting an operation for supplying an apply preparation hydraulic pressure in preparation for the shift into the second predetermined gear, with respect to a friction apply element that will be applied in the second predetermined gear, from among the plurality of friction apply elements, while continuing that shift operation.

In the foregoing aspect, the shift condition may be satisfied when, during the shift operation of the automatic transmission during the power-off downshift, it is estimated that there is a possibility that there will be a demand for the shift into the second predetermined gear which has a larger gear ratio than the first predetermined gear that is to be established by that shift operation.

According to the foregoing structure, when it is estimated that there is a possibility that there will be a demand for a shift into the second predetermined gear during a shift operation in the automatic transmission during a power-off downshift, an operation to supply apply preparation hydraulic pressure in preparation for the shift into the second predetermined gear is started even if there has not yet been a demand to shift into that second predetermined gear. That is, the friction apply element to be applied in the second predetermined gear starts to be moved toward the apply side even while the foregoing shift operation (i.e., the shift operation into the first predetermined gear which has a lower gear ratio than the second predetermined gear) continues to be performed. In this case, hydraulic pressure that will not actually cause the friction apply element that is to be applied in the second predetermined gear to apply is supplied such that the friction apply element is placed in a state right before the applied state (i.e., a position right before the end of the piston stroke), for example. Therefore, if there is then a demand for a shift into the second predetermined gear, a shift operation into the second predetermined gear can be performed quickly following that shift demand because the friction apply element has already been placed in the state immediately preceding the applied state. Accordingly, even if a downshift operation is performed in a plurality of steps, the total shift time can be shortened. As a result, even if a downshift operation is performed in a plurality of steps when the vehicle is decelerating relatively rapidly, for example, a gear appropriate for the vehicle speed can be established, thereby enabling shift shock to be suppressed.

Also, with the foregoing structure, even if a shift operation during a power-off downshift (i.e., a shift operation into the first predetermined gear that has a lower gear ratio than the second predetermined gear) is not yet complete when there is a demand to shift into the second predetermined gear, a shift operation into the second predetermined gear may be started (i.e., an apply operation of the friction apply element to be applied in the second predetermined gear may be started) without completing the shift operation that is currently being executed, if enough apply preparation hydraulic pressure to perform the shift operation into the second predetermined gear has been supplied.

With the foregoing structure, the shift condition may be satisfied when, during the shift operation of the automatic transmission during the power-off downshift, it is determined that there is a demand for the shift into the second predetermined gear which has a larger gear ratio than the first predetermined gear that is to be established by that shift operation.

According to this structure, when it is determined that there is a demand for a shift into the second predetermined gear during a shift operation in the automatic transmission during a power-off downshift, the friction apply element to be applied in the second predetermined gear starts to be moved toward the apply side (i.e., an operation to supply apply preparation hydraulic pressure in preparation for a shift is started) even while the foregoing shift operation (i.e., the shift operation into the first predetermined gear which has a lower gear ratio than the second predetermined gear) continues to be performed. In this case as well, hydraulic pressure that will not actually cause the friction apply element that is to be applied in the second predetermined gear to apply is supplied such that the friction apply element is placed in a state right before the applied state, for example. Therefore, for example, it is possible to have the friction apply element that is to be applied in the second predetermined gear already be in a state immediately preceding the applied state when the shift operation during the power-off downshift is complete so a subsequent shift operation into the second predetermined gear can be performed quickly. Therefore, even if a downshift operation is performed in a plurality of steps, the total shift time can be shortened. As a result, even if a downshift operation is performed in a plurality of steps when the vehicle is decelerating relatively rapidly, for example, a gear that is appropriate for the vehicle speed can be established, thereby enabling shift shock to be suppressed.

Also with the foregoing structure, even if a shift operation during a power-off downshift (i.e., a shift operation into the first predetermined gear that has a lower gear ratio than the second predetermined gear) is not yet complete when there is a demand to shift into the second predetermined gear, a shift operation into the second predetermined gear may be started (i.e., an apply operation of the friction apply element to be applied in the second predetermined gear may be started) without waiting until that shift operation is complete, if enough apply preparation hydraulic pressure to perform the shift operation into the second predetermined gear has been supplied.

A second aspect of the invention relates to a hydraulic control apparatus of an automatic transmission which is provided with a plurality of friction apply elements and in which a gear ratio is established by selectively applying the plurality of friction apply elements by controlling hydraulic pressure with respect to the plurality of friction apply elements. This hydraulic control apparatus includes next-shift preparing means for, when a shift condition for shifting into a second predetermined gear which has a larger gear ratio than a first predetermined gear which is the current gear of the automatic transmission is satisfied during power-off, starting an operation for supplying an apply preparation hydraulic pressure in preparation for the shift into the second predetermined gear, with respect to a friction apply element that will be applied in the second predetermined gear, from among the plurality of friction apply elements.

With this structure, the shift condition may be satisfied when it is estimated that there is a possibility that during power-off there will be a demand for the shift into the second predetermined gear that has a larger gear ratio than the first predetermined gear which is the current gear of the automatic transmission.

Also, with the foregoing structure, the shift condition may be satisfied when, during power-off, it is determined that there is a demand for the shift into the second predetermined gear that has a larger gear ratio than the first predetermined gear which is the current gear of the automatic transmission.

With the foregoing structure, it may be estimated that there is a possibility that there will be a demand for a shift into the second predetermined gear when a vehicle continues to decelerate at a rate faster than a predetermined deceleration rate for a predetermined period of time. In this case, the deceleration rate of the vehicle is detected based on an output value from a sensor or the like that can obtain a detection value indicative of the deceleration rate of the vehicle, such as a vehicle speed sensor or a G sensor. It is estimated that there is a possibility that there will be a demand for a shift into the second predetermined gear when that deceleration rate continues to be relatively high for a predetermined period of time. Incidentally, the predetermined deceleration rate and the predetermined period of time are values that are set empirically through testing or the like.

With the foregoing structure, it may be estimated that there is a possibility that there will be a demand for the shift into the second predetermined gear when a vehicle speed of a vehicle changes from being higher than a next shift hydraulic pressure apply start vehicle speed that is set in advance to being lower than that next shift hydraulic pressure apply start vehicle speed.

With the foregoing structure, when it is assumed that the vehicle will continue to decelerate from a second predetermined gear vehicle speed that corresponds to the second predetermined gear, the next shift hydraulic pressure supply start vehicle speed may be set to be the vehicle speed a predetermined period of time before the vehicle speed of the vehicle reaches the second predetermined gear vehicle speed, the predetermined period of time being the time that it takes for a friction apply element that is to be applied when establishing the second predetermined gear, from among the plurality of friction apply elements, to change from a released state to an applied state.

In this way, it is estimated whether there is a possibility that there will be a demand for a shift into the second predetermined gear based on the deceleration rate of the vehicle and the comparison of the current vehicle speed and the next shift hydraulic pressure supply start vehicle speed, which makes this estimation operation highly reliable. Accordingly, shift shock is able to be reliably suppressed by establishing a gear that is appropriate for the vehicle speed.

With the foregoing structure, it may also be determined that there is a demand to shift into the second predetermined gear when the vehicle speed of the vehicle matches a value corresponding to the second predetermined gear based on a shift map that sets the gear according to the vehicle speed. In this case, for example, a shift map for power-off downshift (e.g., a shift map in which the shift lines have been displaced toward the higher vehicle speed side compared with a shift map that is used during normal running) is used, and it is determined that there is a shift demand when the vehicle speed of the vehicle matches a value that corresponds with the second predetermined gear (i.e., when a shift line is crossed such that the shift region changes to that of the second predetermined gear) on that shift map. Incidentally, a shift map for a power-off downshift does not necessarily need to be provided. When one is not provided, it may be determined that there is a shift demand when the vehicle speed matches a value that corresponds with the second predetermined gear according to the shift map that is used during normal running.

With the foregoing structure, an apply operation of the friction apply element that is to be applied in the second predetermined gear may be started after the shift operation into the first predetermined gear, which is being performed after the operation in preparation for the shift into the second predetermined gear is started, is complete.

Furthermore, the operation when there is no demand to shift into the second predetermined gear after the operation to supply the apply preparation hydraulic pressure starts, as well as the operation when a demand for that shift into the second predetermined gear is cancelled (i.e., when there is no longer a demand for the shift into the second predetermined gear) are as follows.

First, with a structure in which it is estimated that there is a possibility that there will be a demand for a shift into the second predetermined gear, the apply preparation hydraulic pressure in preparation for the shift into the second predetermined gear may be drained when it is no longer estimated that there is a possibility that there will be a demand for the shift into the second predetermined gear before the shift operation is complete.

On the other hand, with a structure in which it is determined that there is a demand for a shift into the second predetermined gear, the apply preparation hydraulic pressure in preparation for the shift into the second predetermined gear may be drained when, before the shift operation is complete, it is determined that there is no longer a demand for the shift into the second predetermined gear.

Accordingly, it is possible to avoid a case in which more hydraulic pressure than is necessary is supplied to the friction apply element to be applied in the second predetermined gear. In addition, it is also possible to prevent an unnecessary shift operation into the second predetermined gear. It is also possible to inhibit the base pressure (i.e., the line pressure) of the overall hydraulic circuit from increasing more than is necessary, as well as increase the reliability of shift operations in the automatic transmission. As a result, an increase in hydraulic fluid temperature can be suppressed, and the frequency with which the friction apply elements are used can be reduced.

With the foregoing structure, when supply of a predetermined apply preparation hydraulic pressure according to the apply preparation hydraulic pressure supply operation in preparation for a shift into the second predetermined gear is complete before the shift operation into the first predetermined gear, which is being performed after the operation in preparation for the shift into the second predetermined gear is started, is complete, the apply operation of the friction apply element that is to be applied in the second predetermined gear may be started without waiting until the shift operation is complete.

According to this structure, a shift operation resembling a skip shift is performed as a shift operation of the automatic transmission while having the shift control operation in response to a shift command be that for sequential shifting. Despite the fact that this shift operation resembles a skip shift, the shift operation into the second predetermined gear is performed after the operation to supply apply preparation hydraulic pressure, which was supplied in advance in preparation for the shift, is complete. Accordingly, a downshift can be performed by skipping over gears without causing a delay in the apply operation of friction apply elements that occurs in a skip shift according to the related art. As a result, drivability can be improved by the suppression of shift shock, while a shift operation into the second predetermined gear is able to be performed quickly. Incidentally, the predetermined apply preparation hydraulic pressure is hydraulic pressure that moves the friction apply element to be applied in the second predetermined gear to a state right before the applied state (i.e., to a position right before the end of the piston stroke).

Further, with the foregoing structure, the next-shift preparing means may start the apply preparation hydraulic pressure supply operation in preparation for a shift into a third predetermined gear which has a larger gear ratio than the second predetermined gear with respect to a friction apply element that will be applied in the third predetermined gear, from among the plurality of friction apply elements, at substantially the same time that the apply preparation hydraulic pressure supply operation in preparation for the shift into the second predetermined gear starts with respect to the friction apply element that will be applied in the second predetermined gear. As a result, the total shift time when a downshift operation is performed in a plurality of steps can be shortened.

A third aspect of the invention relates to a hydraulic control method for an automatic transmission which is provided with a plurality of friction apply elements and in which a gear ratio is established by selectively applying the plurality of friction apply elements by controlling hydraulic pressure with respect to the plurality of friction apply elements. This hydraulic control method includes determining whether, during a shift operation of the automatic transmission during a power-off downshift, a shift condition for shifting into a second predetermined gear which has a larger gear ratio than a first predetermined gear which is to be established by that shift operation is satisfied; and starting, when the shift condition is satisfied, an apply preparation hydraulic pressure supply operation in preparation for the shift into the second predetermined gear, with respect to a friction apply element that is to be applied in the second predetermined gear, from among the plurality of friction apply elements, while continuing that shift operation.

A fourth aspect of the invention relates to a hydraulic control method for an automatic transmission which is provided with a plurality of friction apply elements and in which a gear ratio is established by selectively applying the plurality of friction apply elements by controlling hydraulic pressure with respect to the plurality of friction apply elements. This hydraulic control method includes determining whether a shift condition for shifting into a second predetermined gear which has a larger gear ratio than a first predetermined gear which is the current gear of the automatic transmission is satisfied during power-off; and starting, when the shift condition is satisfied, an apply preparation hydraulic pressure supply operation in preparation for the shift into the second predetermined gear, with respect to a friction apply element that will be applied in the second predetermined gear, from among the plurality of friction apply elements.

According to the invention, apply preparation hydraulic pressure is supplied in advance so when there is a demand for a shift into a gear having a larger gear ratio than the current gear of the automatic transmission in a power-off state, that the shift operation into that gear can be performed quickly. Accordingly, the amount of time that it takes for the friction apply element that is used to establish that gear to start to apply following the demand to shift into that gear can be shortened. Therefore, even if a downshift operation is performed in a plurality of steps when the vehicle is decelerating relatively quickly, the gear appropriate for the vehicle speed can be established without a delay in the shift operation so shift shock can be suppressed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 6 is a clutch and brake application chart showing the apply states of the clutches and brakes in the shift mechanism shown in FIG. 1 for each gear;

DETAILED DESCRIPTION OF THE EMBODIMENTS

In the following description and the accompanying drawings, the present invention will be described in more detail in terms of example embodiments. In the following description, the powertrain and the basic operation and the like of the automatic transmission of the vehicle will first be described, after which power-off downshift control, which is the characteristic control of the example embodiments, will be described.

Figure 1:
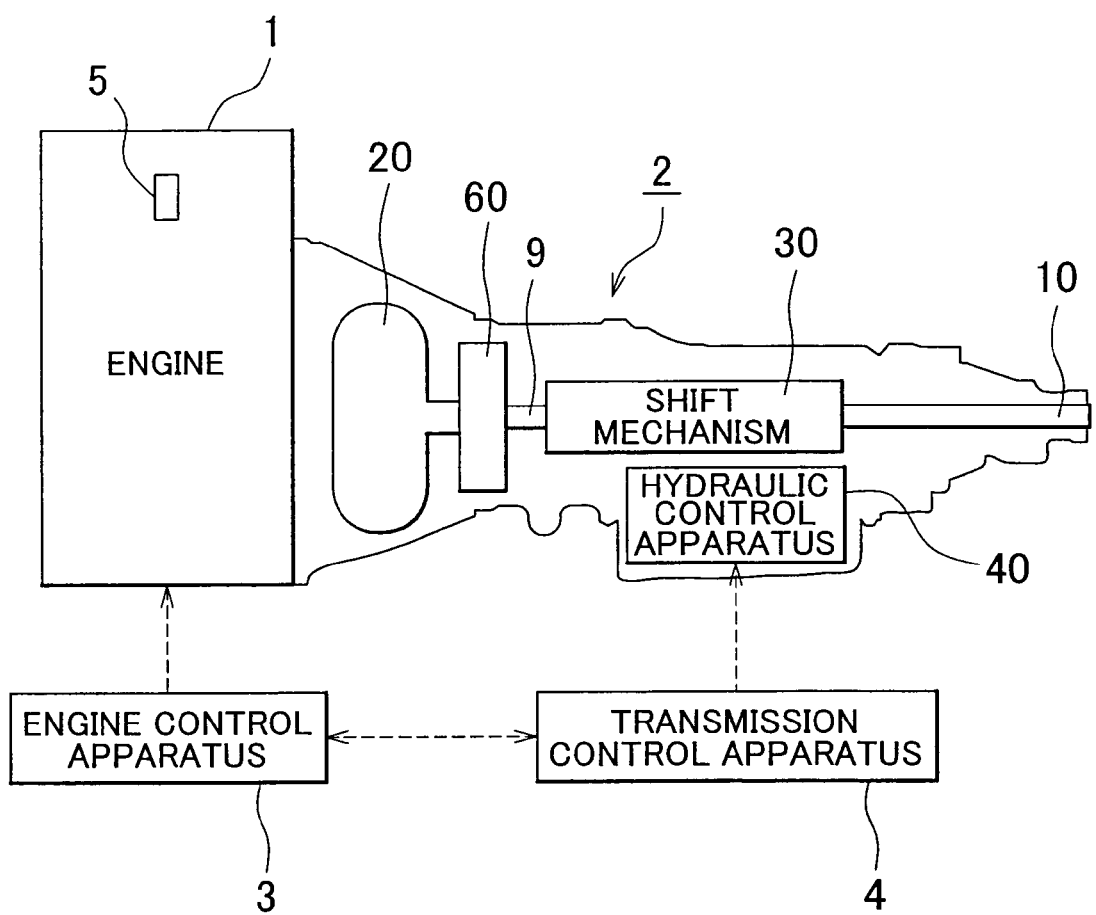
FIG. 1 is a block diagram schematically showing a powertrain of a vehicle to which a hydraulic control apparatus of an automatic transmission according to first, second, and third example embodiments of the invention can be applied.
Figure 2:
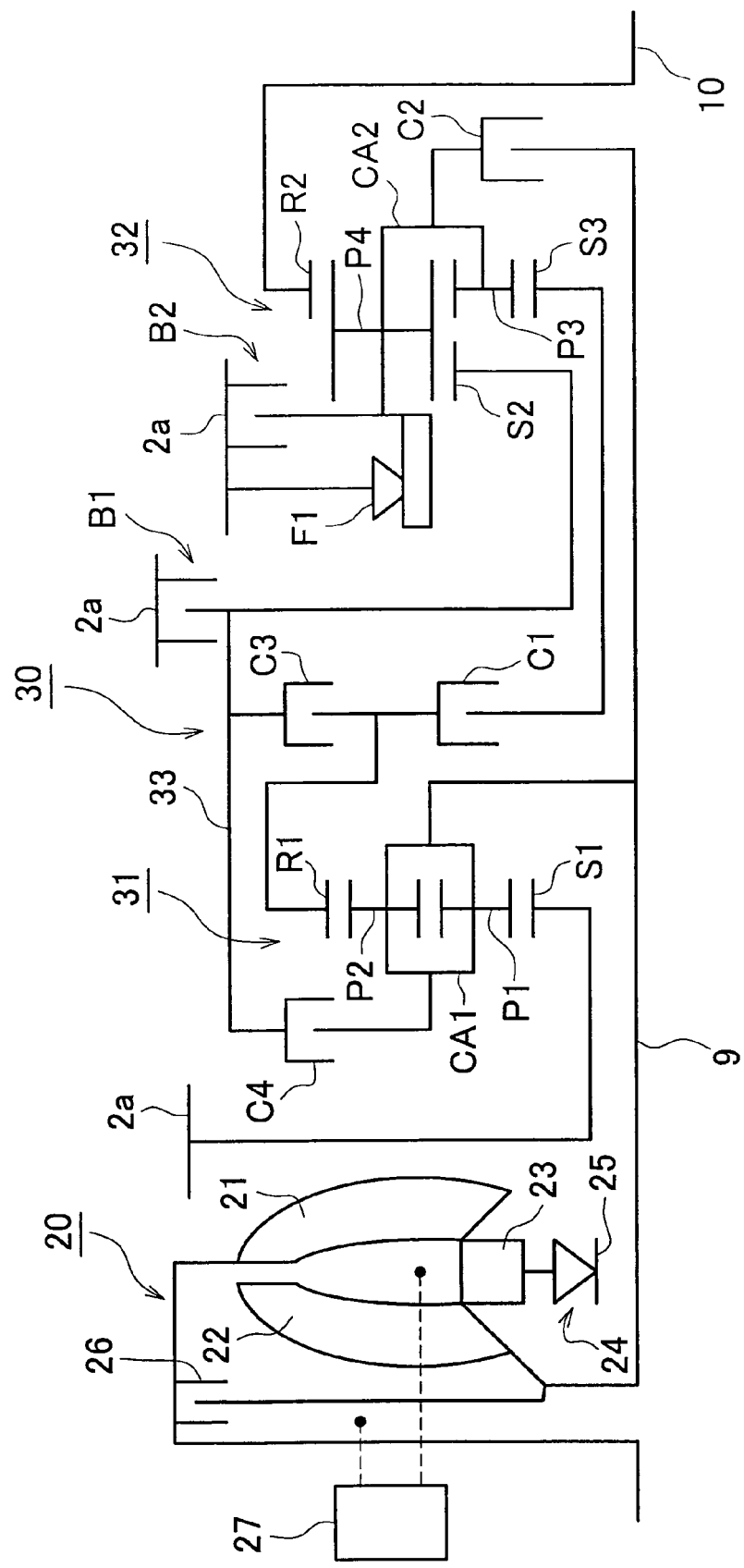
FIG. 2 is a skeleton graph showing an example of the automatic transmission shown in FIG. 1.
Figure 3:
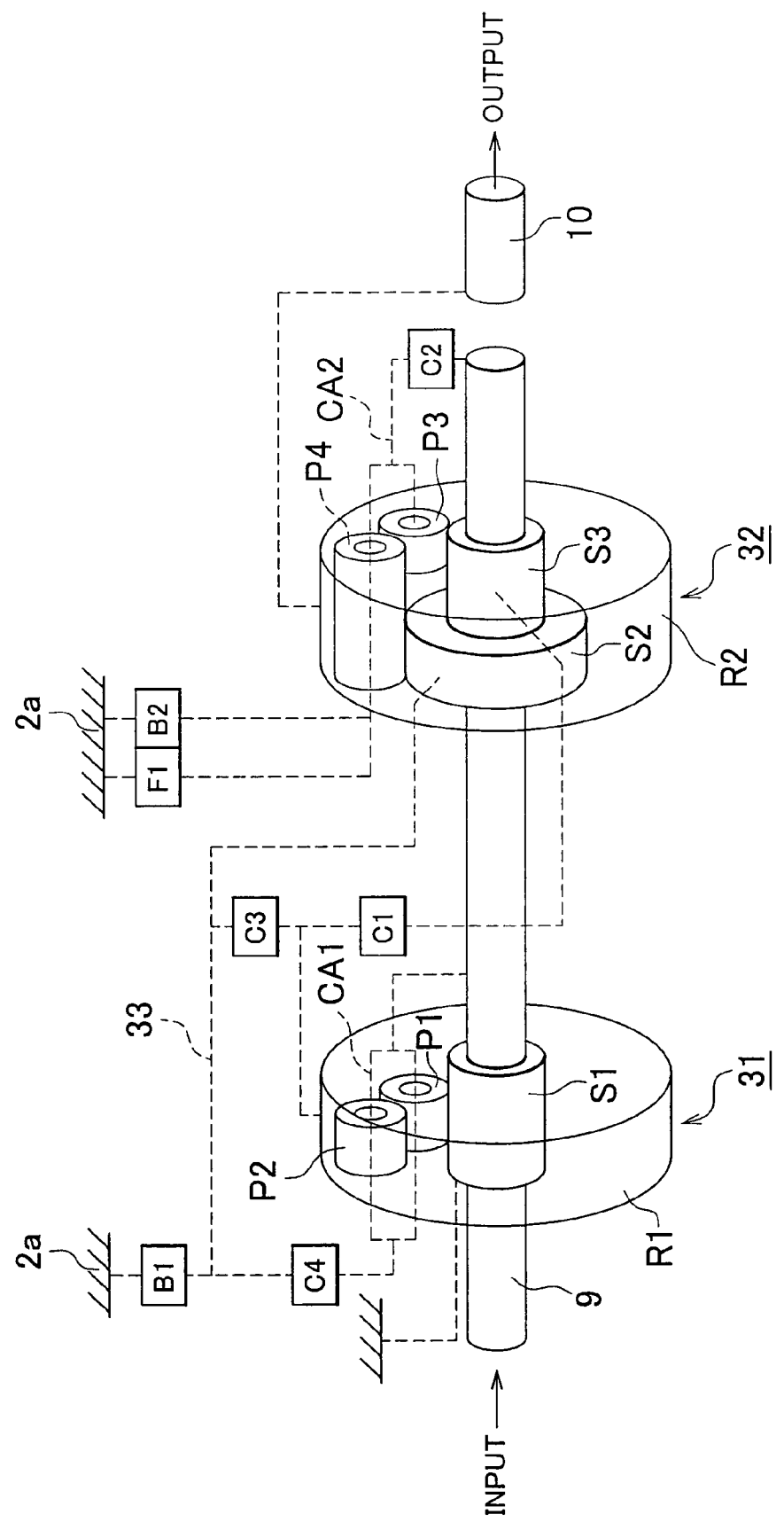
FIG. 3 is a perspective view showing a frame format of a portion of a shift mechanism shown in FIG. 2.

FIG. 1 is a block diagram schematically showing a powertrain of a vehicle in first, second, and third example embodiments of the invention. FIG. 2 is a skeleton graph showing an example of an automatic transmission 2 shown in FIG. 1, and FIG. 3 is a perspective view showing a frame format of a shift mechanism 30 shown in FIGS. 1 and 2.

As shown in FIG. 1, the vehicle to which a hydraulic control apparatus for an automatic transmission according to the example embodiments of the invention is provided with an engine 1, the automatic transmission 2, an engine control apparatus (i.e., engine ECU) 3, and a transmission control apparatus (i.e., transmission ECU) 4.

The engine 1 generates rotary power by burning an air-fuel mixture in which air that is drawn in from the outside is mixed with fuel that is injected from a fuel injection valve 5 at an appropriate ratio. This fuel injection valve 5 is controlled by the engine control apparatus 3.

The automatic transmission 2 mainly includes a torque converter 20, the shift mechanism 30, a hydraulic control apparatus 40, and an oil pump 60. Incidentally, the automatic transmission in this example embodiment is capable of establishing eight forward speeds (i.e., gears) and one reverse speed (i.e., gear).

As shown in FIG. 2, the torque converter 20 is rotatably connected to the engine 1 and includes a pump impeller 21, a turbine runner 22, a stator 23, a one-way clutch 24, a stator shaft 25, and a lockup clutch 26.

The one-way clutch 24 supports the stator 23 on a case 2a of the automatic transmission 2 and allows the stator 23 to rotate in only one direction. The stator shaft 25 fixes an inner race of the one-way clutch 24 to the case 2a of the automatic transmission 2.

The lockup clutch 26 enables the pump impeller 21 and the turbine runner 22 of the torque converter to lock together. The lockup clutch 26 can switch as necessary between an applied state in which it locks or couples the pump impeller 21 to the turbine runner 22, a released state in which it uncouples the pump impeller 21 from the turbine runner 22, and a partially-applied state which is a state in between the applied state and the released state.

Apply force control of this lockup clutch 26 is performed by controlling the hydraulic pressure with respect to the pump impeller 21 and the turbine runner 22 using a lockup control valve 27.

The shift mechanism 30 takes the rotation speed input from the torque converter 20 to an input shaft 9, changes it, and then outputs that changed rotation speed to an output shaft 10. As shown in FIGS. 2 and 3, the shift mechanism 30 includes a front planetary gear set 31, a rear planetary gear set 32, an intermediate drum 33, first to fourth clutches C1 to C4, and first and second brakes B1 and B2.

The front planetary gear set 31 is a so-called double pinion type planetary gear set which includes a first sun gear S1, a first ring gear R1, a plurality of inner pinion gears P1, a plurality of outer pinion gears P2, and a first carrier CA1.

Incidentally, the first sun gear S1 is fixed to the case 2a of the automatic transmission 2 and is thus unable to rotate. The first ring gear R1 is supported by the intermediate drum 33 via the third clutch C3 such that it can either rotate together with the intermediate drum 33 or relative to it. The sun gear 51 is arranged concentrically on the inner radial side of the first ring gear R1.

The plurality of inner pinion gears P1 and the plurality of outer pinion gears P2 are sandwiched between the first sun gear S1 and the first ring gear R1 in a plurality of locations at predetermined intervals in the circumferential direction, with the plurality of inner pinion gears P1 being in mesh with the first sun gear S1 and the plurality of outer pinion gears P2 being in mesh with the inner pinion gears P1 and the first ring gear R1.

The first carrier CA1 rotatably supports both sets of pinion gears P1 and P2. A center shaft portion of the first carrier CA1 is integrally connected to the input shaft 9. Bearing portions that support the two sets of pinion gears P1 and P2 on the first carrier CA1 are supported by the intermediate drum 33 via the fourth clutch C4 so that they can either rotate together with the intermediate drum 33 or relative to it.

Also, the intermediate drum 33 is rotatably arranged on the outer radial side of the first ring gear R1, and is supported by the case 2a of the automatic transmission 2 via the first brake B1 so that it can either be held against rotation or rotate relative to the case 2a.

The rear planetary gear set 32 is a so-called Ravigneaux type planetary gear set that includes a large diameter second sun gear S2, a small diameter third sun gear S3, a second ring gear R2, a plurality of short pinion gears P3, a plurality of long pinion gears P4, and a second carrier CA2.

Incidentally, the second sun gear S2 is connected to the intermediate drum 33, and the third sun gear S3 can be selectively connected to the first ring gear R1 of the front planetary gear set 31 via the first clutch C1 so that it rotates either together with the first ring gear R1 or relative to it. The second ring gear R2 is integrally connected to the output shaft 10.

Also, the plurality of short pinion gears P3 are in mesh with the third sun gear S3, and the plurality of long pinion gears P4 are in mesh with both the second sun gear S2 and the second ring gear R2, as well as with the third sun gear S3 via the short pinion gears P3.

Further, the second carrier CA2 rotatably supports the plurality of short pinion gears P3 and the plurality of long pinion gears P4. A center shaft portion of the second carrier CA2 can be selectively connected to the input shaft 9 via the second clutch C2. Support shaft portions that support the pinion gears P3 and P4 on the second carrier CA2 are supported by the case 2a of the automatic transmission 2 via the brake B2 and the one-way clutch F1.

The first to fourth clutches C1 to C4 and the first and second brakes B1 and B2 are wet type multiple disc friction apply elements that use the viscosity of oil.

The first clutch C1 is used to place the third sun gear S3 of the rear planetary gear set 32 in either an applied state in which the third sun gear S3 is connected to the first ring gear R1 of the front planetary gear set 31 so that it rotates together with the first ring gear R1, or a released state in which the third sun gear S3 is disconnected from the first ring gear R1 of the front planetary gear set 31 so that it rotates relative thereto.

The second clutch C2 is used to place the second carrier CA2 of the rear planetary gear set 32 in either an applied state in which the second carrier CA2 is connected to the input shaft 9 so that it rotates together with the input shaft 9, or a released state in which the second carrier CA2 is disconnected from the input shaft 9 so that it rotates relative thereto.

The third clutch C3 is used to place the first ring gear R1 of the front planetary gear set 31 in either an applied state in which the first ring gear R1 is connected to the intermediate drum 33 so that it rotates together with the intermediate drum 33, or a released state in which the first ring gear R1 is disconnected from the intermediate drum 33 so that it rotates relative thereto.

The fourth clutch C4 is used to place the first carrier CA1 of the front planetary gear set 31 in either an applied state in which the first carrier CA 1 is connected to the intermediate drum 33 so that it rotates together with the intermediate drum 33, or a released state in which the first carrier CA1 is disconnected from the intermediate drum 33 so that it rotates relative thereto.

The first brake B1 is used to place the intermediate drum 33 in either an applied state in which the intermediate drum 33 is locked to the case 2a of the automatic transmission 2 so that it is held against rotation, or a released state in which the intermediate drum 33 is released from the case 2a of the automatic transmission 2 so that it can rotate relative thereto.

The second brake B2 is used to place the second carrier CA2 of the rear planetary gear set 32 in either an applied state in which the second carrier CA2 is locked to the case 2a of the automatic transmission 2 so that it is held against rotation, or a released state in which the second carrier CA2 is released from the case 2a of the automatic transmission 2 so that it can rotate relative thereto.

The one-way clutch F1 allows the second carrier CA2 of the rear planetary gear set 32 to rotate in only one direction.

Figure 4:
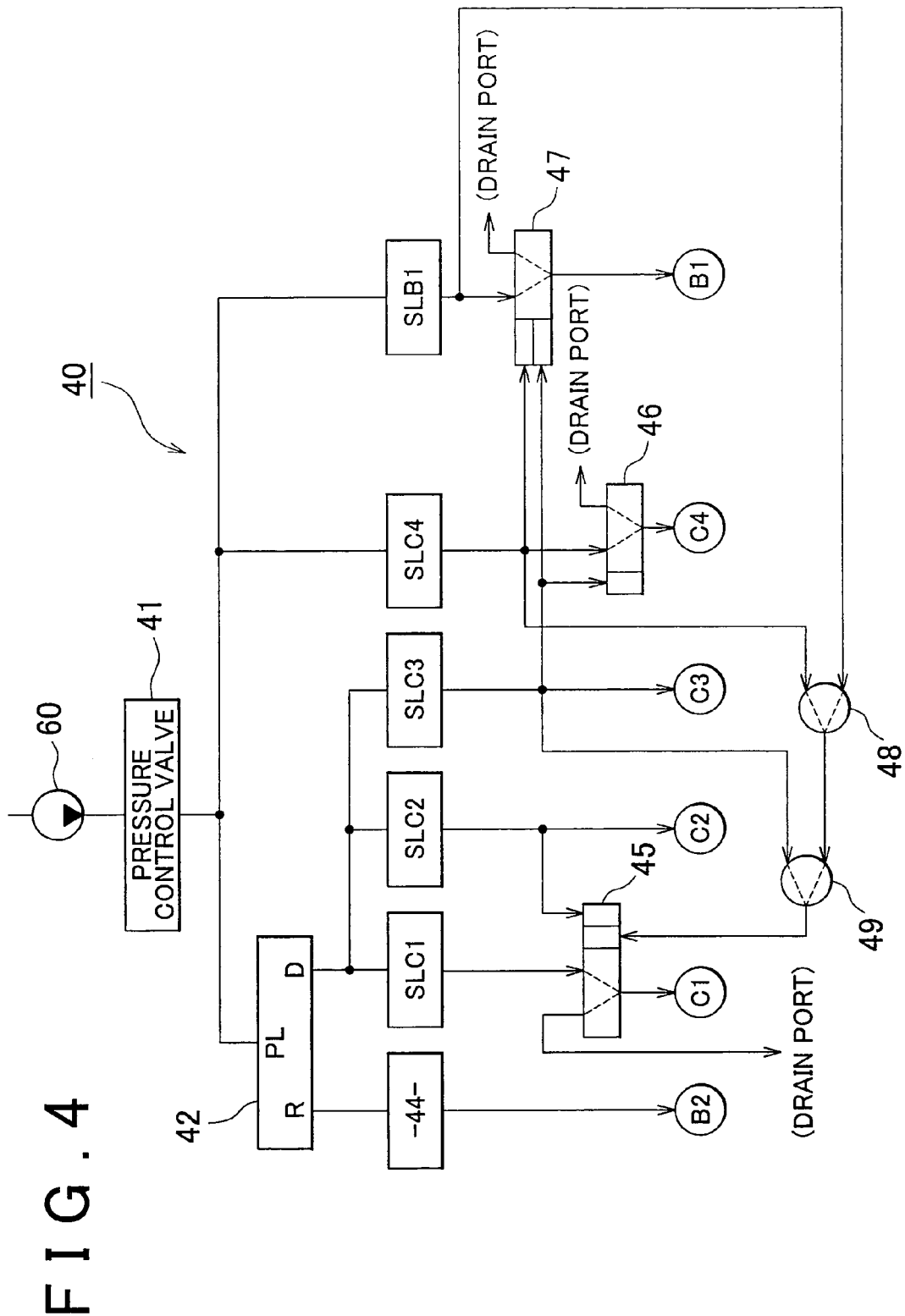
FIG. 4 is a diagram showing the structure of the hydraulic control apparatus shown in FIG. 1.

The hydraulic control apparatus 40 shown in FIG. 1 controls the shift operations of the shift mechanism 30. As shown in FIG. 4, the hydraulic control apparatus 40 mainly includes a pressure control valve 41, a manual valve 42, a plurality of linear solenoid valves SLC1, SLC2, SLC3, SLC4, and SLB1, a B2 control valve 44, cutoff valves 45, 46, and 47 which serve as failsafe valves, and switch valves 48 and 49.

The pressure control valve 41 controls the hydraulic pressure from the oil pump 60 to a predetermined line pressure, and then supplies that predetermined line pressure to a port PL of the manual valve 42, and the linear solenoid valves SLC4 and SLB1.

The manual valve 42 supplies the hydraulic pressure to the linear solenoid valves SLC1, SLC2, and SLC3 from port D, and to the B2 control valve 44 from port R as appropriate to establish the neutral range N, the forward running range D, or the reverse running range R according to an operation of the shift lever by the driver.

The plurality of linear solenoid valves SLC1, SLC2, SLC3, SLC4, and SLB1 independently drive the first to fourth clutches C1 to C4 and the first brake B1, respectively, in the shift mechanism 30. The basic structures of these linear solenoid valves are well known so detailed drawings and descriptions will be omitted.

Incidentally, with regard to the reference characters of the linear solenoid valves SLC1, SLC2, SLC3, SLC4, and SLB1, the letters SL refer to linear solenoid valve and the appended characters indicate the specific hydraulic friction apply element (from among the first to fourth clutches C1 to C4 and the first brake B1) to which that linear solenoid valve corresponds.

In each linear solenoid valve SLC1, SLC2, SLC3, SLC4, and SLB1, a solenoid (no reference character) is activated in response to a control signal (i.e., a control current) supplied from the transmission control apparatus 4, so as to move a valve body, not shown, to a predetermined position against the spring force of a compressed spring, thereby opening or closing, or increasing or decreasing the opening amounts, of the necessary ports.

The B2 control valve 44 drives the second brake B2.

The first cutoff valve 45 is interposed between the first clutch C1 and the linear solenoid valve SLC1, and is structured as a failsafe valve which, when hydraulic pressure is supplied to two input ports at the same time, blocks hydraulic pressure from being supplied from the linear solenoid valve SLC1 to the first clutch C1 through the output port, and instead discharges that hydraulic pressure from a drain port into the case 2a of the automatic transmission 2.

The second cutoff valve 46 is interposed between the fourth clutch C4 and the linear solenoid valve SLC4, and is structured as a failsafe valve which, when hydraulic pressure is supplied to one input port from the linear solenoid valve SLC3, blocks hydraulic pressure from being supplied from the linear solenoid valve SLC4 to the fourth clutch C4 through the output port, and instead discharges that hydraulic pressure from a drain port into the case 2a of the automatic transmission 2.

The third cutoff valve 47 is interposed between the first brake B1 and the linear solenoid valve SLB1, and is structured as a failsafe valve which, when hydraulic pressure is supplied to one of the two input ports from the linear solenoid valve SLC3 or SLC4, blocks hydraulic pressure from being supplied from the linear solenoid valve SLB1 to the first brake B1 through the output port, and instead discharges that hydraulic pressure from a drain port into the case 2a of the automatic transmission 2.

The switch valves 48 and 49 are arranged in series between the linear solenoid valve SLB1 and one input port of the first cutoff valve 45.

A hydraulic pressure line of the linear solenoid valve SLB1 and a hydraulic pressure line of the linear solenoid valve SLC4 are connected in parallel to the two input ports of the first switch valve 48. Also, an output line of the first switch valve 48 and a hydraulic pressure line of the linear solenoid valve SLC3 are connected in parallel to the two input ports of the second switch valve 49. When hydraulic pressure is supplied to one of the input ports of these first and second switch valves 48 and 49, these first and second switch valves 48 and 49 output that supplied hydraulic pressure from the output ports.

The engine control apparatus 3 and the transmission control apparatus 4 shown in FIG. 1 are both generally known ECUs (Electronic Control Units) and have generally the same hardware structure. The specific structure of the transmission control apparatus 4 in this example embodiment will now be described with reference to FIG. 5.

The transmission control apparatus 4 establishes the appropriate gear, i.e., power transmission path, in the shift mechanism 30 by controlling the hydraulic control apparatus 40.

Figure 5:
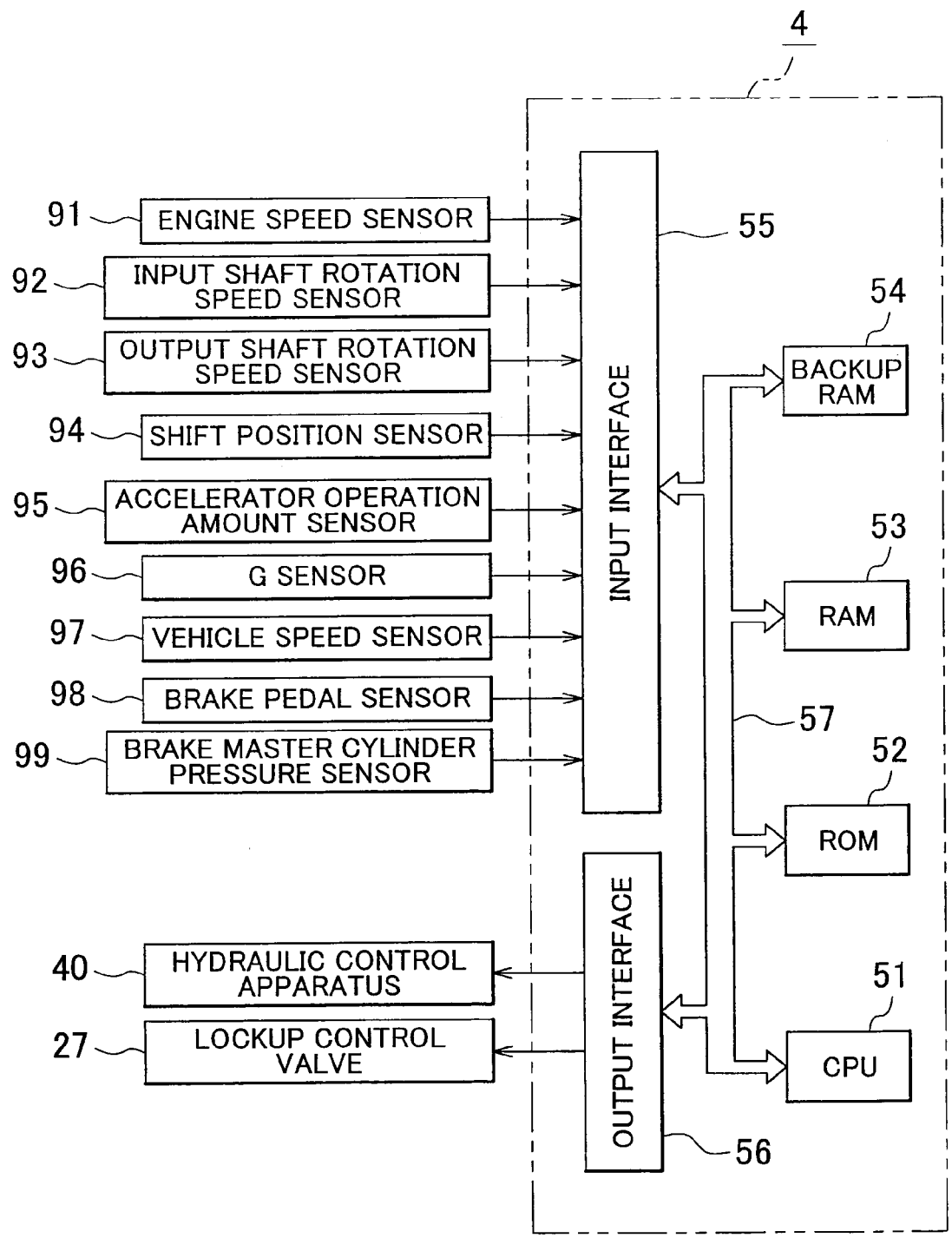
FIG. 5 is a block diagram showing the structure of a transmission control apparatus shown in FIG. 1.

That is, as shown in FIG. 5, the transmission control apparatus 4 includes a central processing unit (CPU) 51, read-only memory (ROM) 52, random access memory (RAM) 53, backup RAM 54, an input interface 55, and an output interface 56, all of which are connected together by a bidirectional bus 57.

The CPU 51 performs computations based on control maps and various control programs for controlling shift operations in the shift mechanism 30 which are stored in the ROM 52. The RAM 53 is memory that temporarily stores the computation results of the CPU 51 as well as data input from various sensors and the like. The backup RAM 54 is nonvolatile memory that stores various data to be saved.

Various sensors are connected to the input interface 55. At the very least, these sensors include an engine speed sensor 91, an input shaft rotation speed sensor 92, an output shaft rotation speed sensor 93, a shaft position sensor 94, an accelerator operation amount sensor 95, a G sensor 96, a vehicle speed sensor 97, a brake pedal sensor 98, and a brake master cylinder pressure sensor 99. Various valves are also connected to the output interface 56. At the very least, these valves include the constituent elements of the hydraulic control apparatus 40 (i.e., the pressure control valve 41, the manual valve 42, the linear solenoid valves SLC1, SLC2, SLC3, SLC4, SLB1, and the B2 control valve 44), and the lockup control valve 27 for hydraulic control of the lockup clutch 26.

Incidentally, the engine speed sensor 91 detects, as the engine speed, the rotation speed of the pump impeller 21 of the torque converter 20 to which the rotation of the engine 1 is transmitted. The input shaft rotation speed sensor 92 detects the rotation speed (NT) of the input shaft 9. The output shaft rotation speed sensor 93 detects the rotation speed (NO) of the output shaft 10. The shift position sensor 94 detects the operating position of a shift lever, which will be described later. The accelerator operation amount sensor 95 detects the depression amount of an accelerator pedal. The G sensor 96 detects both longitudinal and lateral acceleration of the vehicle. The vehicle speed sensor 97 detects the running speed of the vehicle. The brake pedal sensor 98 outputs a brake-on signal when a brake pedal is being depressed (i.e., during a braking operation). The brake master cylinder pressure sensor 99 obtains the pedal depression amount when the brake pedal is being depressed from the brake master cylinder pressure, and from this detects the degree of braking required by the driver.

Incidentally, the transmission control apparatus 4 is connected to the engine control apparatus 3 in such a way that signals can be transmitted therebetween. The transmission control apparatus 4 obtains various information relating to engine control from the engine control apparatus 3 when necessary.

Here, the conditions for establishing the various gears in the shift mechanism 30 described above are shown in FIGS. 6 and 7.

FIG. 6 is a clutch and brake application chart showing the relationship between the various gears and the apply and release states of the first to fourth clutches C1 to C4, the first and second brakes B1 and B2, and the one-way clutch F1. In this clutch and brake application chart, a circle indicates an applied state, an X indicates a released state, a double circle (bulls-eye) indicates an applied state when the engine brake is on, and a triangle indicates an applied state only when driving.

Figure 7:
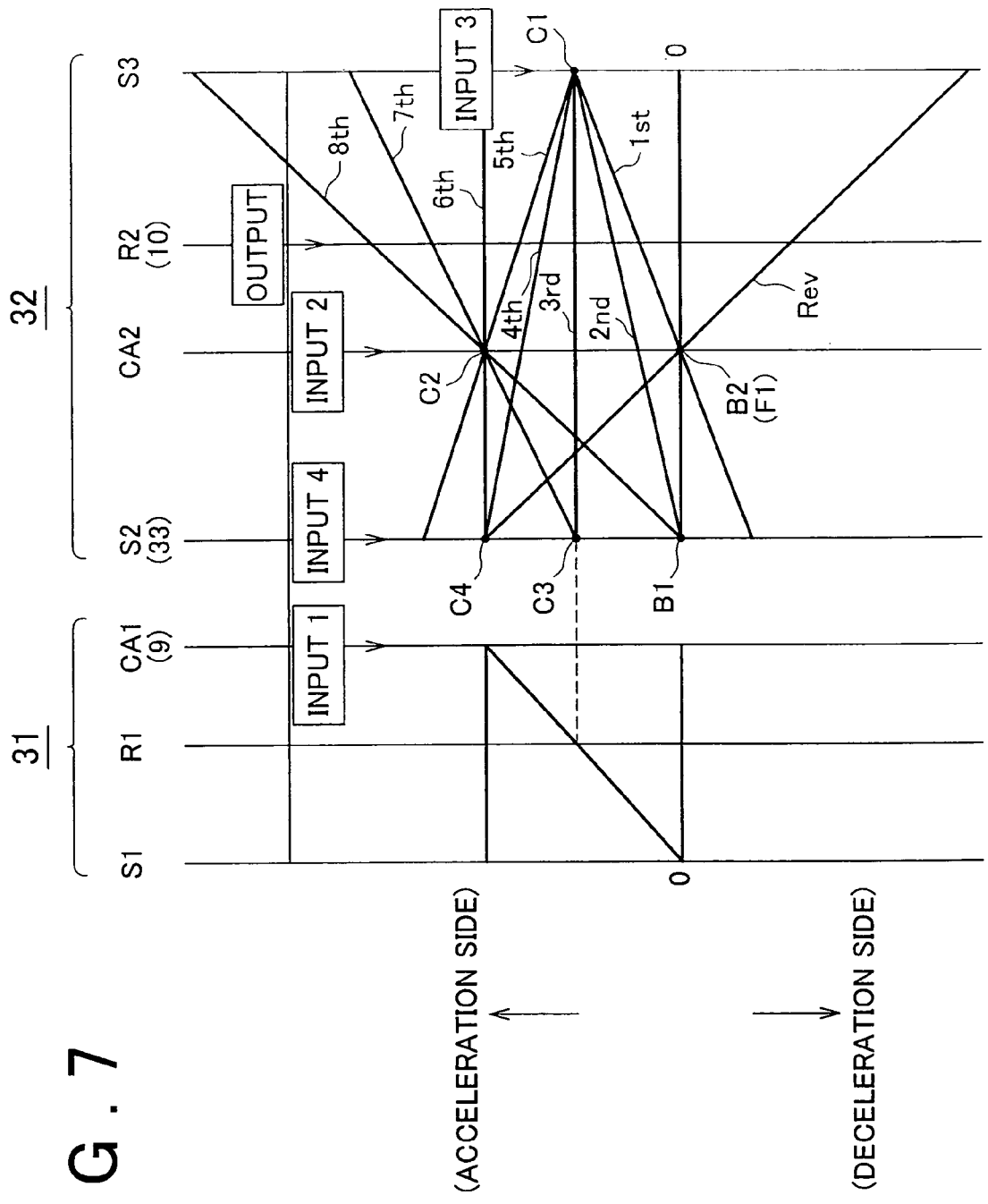
FIG. 7 is a shift line diagram that shows the rotation speed ratio of the constituent elements of both planetary gear sets shown in FIG. 2 for each gear.

FIG. 7 is a shift line diagram showing the relationship between the gears (i.e., 1st gear to 8th gear and reverse) that are established by selectively applying the first to fourth clutches C1 to C4, the first and second brakes B1 and B2, and the one-way clutch F1, and the rotation speed ratios of the various constituent elements of the forward and rear planetary gear sets 31 and 32 at those times.

In FIG. 7, the direction of the vertical axes represents the rotation speed ratio of the constituent elements of the two planetary gear sets 31 and 32, and the intervals between the vertical axes are set according to the gear ratios of the elements. Also, reference characters C1 to C4, B1, B2, and F1 are written at the points at which the first to fourth clutches C1 to C4, the first and second brakes B1 and B2, and the one-way clutch F1, respectively, are applied.

Furthermore, INPUT 1 to INPUT 4 in FIG. 7 represent the input positions of the rotational power from the input shaft 9. Similarly, OUTPUT in FIG. 7 represents the output position of the rotational force output to the output shaft 10.

Figure 8:
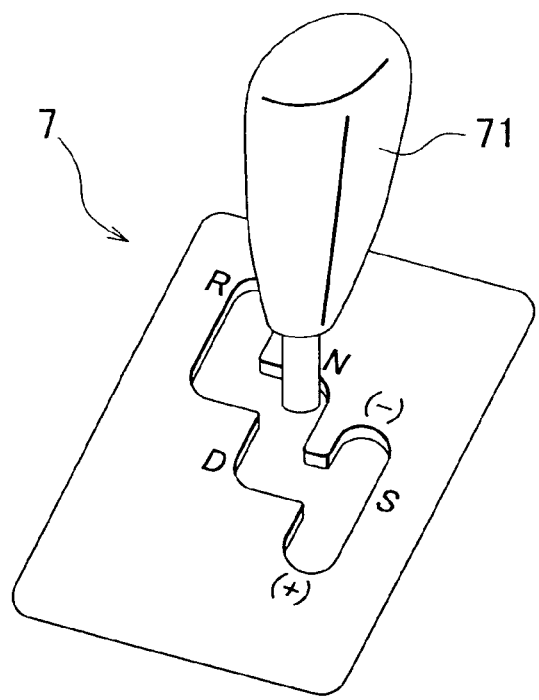
FIG. 8 is a perspective view of a shift apparatus of the vehicle to which the hydraulic control apparatus for an automatic transmission according to the first, second, and third example embodiments of the invention can be applied.

Also, a shift apparatus 7 shown in FIG. 8 is arranged near the driver's seat in the vehicle. This shift apparatus 7 has a displaceable shift lever 71 and various positions, i.e., a reverse (R) position, a neutral (N) position, a drive (D) position, and a sequential (S) position, into which the driver can shift the shift lever 71 as desired. The position of the shift lever 71 (i.e., the position occupied by the shift lever 71, from among the reverse (R) position, the neutral (N) position, the drive (D) position, and the sequential (S) position (including a "+" position and a "−" position, which will be described later)) is detected by the shift position sensor 94.

The circumstances in which the shift position of the shift lever 71 is selected, as well as the operating mode of the automatic transmission at that time, will now be described for each shift position (i.e., the N position, the R position, the D position, and the S position).

The N position is a position that is selected to disconnect the input shaft 9 of the automatic transmission 2 from the output shaft 10. When the shift lever 71 is shifted into the N position, all of the clutches C1 to C4 and brakes B1 and B2 are released in the automatic transmission 2 (see FIG. 6).

The R position is a position that is selected to run the vehicle in reverse. When the shift lever 71 is shifted into the R position, the automatic transmission 2 shifts into reverse (i.e., reverse gear).

The D position is a position that is selected to run the vehicle forward. When the shift lever 71 is shifted in to the D position, the automatic transmission 2 is controlled to automatically shift into one of a plurality of forward gears (eight forward gears) according to the operating state and the like of the vehicle.

The S position is a position (a manual shift position) that is selected when the driver wants to manually perform a shift operation among the plurality of forward gears (eight forward gears). A "−" position is provided to the front of the S position and a "+" position is provided to the rear of the S position. The "+" position is a position into which the shift lever 71 is operated to perform a manual upshift, and the "−" position is a position into which the shift lever 71 is operated to perform a manual downshift. When the shift lever 71 is in the S position and is then pulled back into the "+" position, the automatic transmission 2 upshifts. Similarly, when the shift lever 71 is in the S position and is then pushed forward into the "−" position, the automatic transmission 2 downshifts. More specifically, each time the shift lever 71 is pulled into the "+" position, the gear in the automatic transmission 2 increases by one (e.g., 1st→2nd→ . . . →8th). On the other hand, each time the shift lever 71 is pushed into the "−" position, the gear in the automatic transmission 2 decreases by one (e.g., 8th→7th→ . . . →1st).

Next, the shift map used for shift control of the automatic transmission 2 that is structured as described above will be described with reference to FIG. 9.

Figure 9:
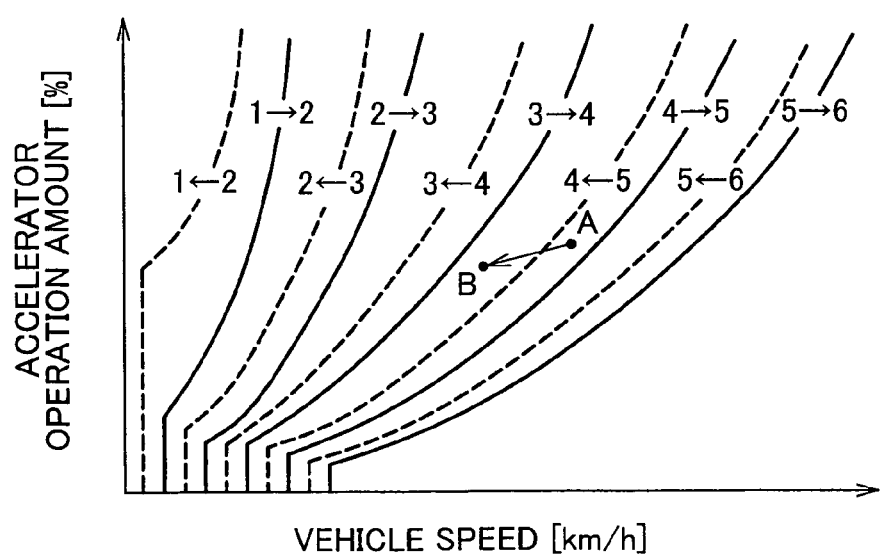
FIG. 9 is a view of a shift map used in shift control of the automatic transmission shown in FIG. 1.

The shift map shown in FIG. 9 is a map which has vehicle speed and accelerator operation amount as parameters, and in which a plurality of ranges for obtaining the appropriate gear have been set according to the vehicle speed and accelerator operation amount. This shift map is stored in the ROM 52 of the transmission control apparatus 4. The ranges in the shift map are divided by a plurality of shift lines (gear shift lines).

Incidentally, in the shift map shown in FIG. 9, the solid lines are upshift lines (shift lines) and the broken lines are downshift lines (shift lines). Also in the drawing, the arrows indicate the directions of the upshifts and downshifts, and the numbers indicate the gears.

Next, the basic operation of shift control will be described.

The transmission control apparatus 4 calculates the vehicle speed from an output signal from the vehicle speed sensor 97 and calculates the accelerator operation amount from an output signal from the accelerator operation amount sensor 95. The transmission control apparatus 4 then calculates a target gear referencing the shift map in FIG. 9, based on the calculated vehicle speed and accelerator operation amount, and determines whether a shift operation is necessary by comparing that target gear with the current gear.

If a shift is not necessary (i.e., if the target gear and the current gear are the same, in which case the appropriate gear is already established), the ECU 100 outputs a solenoid control signal (i.e., a hydraulic pressure command signal) to maintain the current gear to the hydraulic control apparatus 40 of the automatic transmission 2.

If, on the other hand, the target gear is different than the current gear, the transmission control apparatus 4 performs shift control. For example, if the vehicle is running with the automatic transmission 2 in 5th gear and then the running state of the vehicle changes such that there is a change from point A to point B in FIG. 9, for example, the downshift line 5→4 is crossed so the target gear calculated from the shift map becomes 4th gear. Accordingly, the transmission control apparatus 4 outputs a solenoid control command (i.e., a hydraulic pressure command signal) to establish 4th gear to the hydraulic control apparatus 40 of the automatic transmission 2. As a result, a shift from 5th speed to 4th speed (i.e., a 5→4 downshift) is performed.

Next, a plurality of example embodiments related to power-off downshift control, which is the characteristic operation in the automatic transmission 2 having a structure such as that described above, will be described. Incidentally, in the following description, the gear before a shift when a shift operation during a power-off downshift is being performed will be referred to as the "pre-shift gear". Also, the gear during that shift (i.e., the gear that is currently trying to be established) will be referred to as the "initial target gear". Moreover, when there has been a demand to shift into a lower gear (i.e., a gear with a larger gear ratio, such as one gear lower) than the initial target gear while a shift operation is being performed from the pre-shift gear to the initial target gear, that lower gear will be referred to as the "next target gear".

In a first example embodiment of the invention, during a shift operation in a power-off downshift (i.e., while a shift operation from the pre-shift gear to the initial target gear is being performed), the possibility that there will be a demand for a shift into a gear with a larger gear ratio (i.e., the next target gear) than the gear that is to be established by that shift operation is estimated, and hydraulic control is performed accordingly. Also, this example embodiment illustrates a case in which, with the shift operation of the power-off downshift, a shift operation (i.e., an apply operation of a clutch or brake) into the next target gear starts after the shift operation into the initial target gear is complete, even if the demand to shift into the next target gear occurs while the shift operation from the pre-shift gear into the initial target gear is being performed (an example embodiment in which a shift operation into the next target gear is performed without waiting until the shift operation into the initial target gear is complete will be described later). A specific example is as follows.

The automatic transmission 2 according to this example embodiment performs a downshift through multiple gears by repeatedly downshifting one gear at a time (i.e., sequential shifting) during a power-off downshift in which a downshift is performed when the accelerator opening amount is zero or relatively minute and the vehicle speed is decreasing, for example. Accordingly, problems resulting from skip shifting in related art (such as shift shock being produced as a result of the release timing and the apply timing of clutches and brakes being off so that the engine races and there is a loss of torque) can be avoided.

The automatic transmission 2 of this example embodiment performs a shift operation such as that described below based on repeatedly sequential shifting during this power-off downshift.

That is, when, in this power-off downshift state, it has been estimated (in an estimation operation performed by next-shift estimating means) that there will be a demand for a shift into a lower gear (i.e., a gear with a larger gear ratio; i.e., the next target gear) than the gear that the automatic transmission 2 is currently attempting to shift into (i.e., the initial target gear) when the vehicle is decelerating relatively rapidly such as when the driver is depressing the brake pedal, a hydraulic pressure supply operation (i.e., an apply preparation hydraulic pressure supply operation) in preparation to shift into this next target gear is started (i.e., a shift preparation operation is performed by next-shift preparing means).

Figure 10:
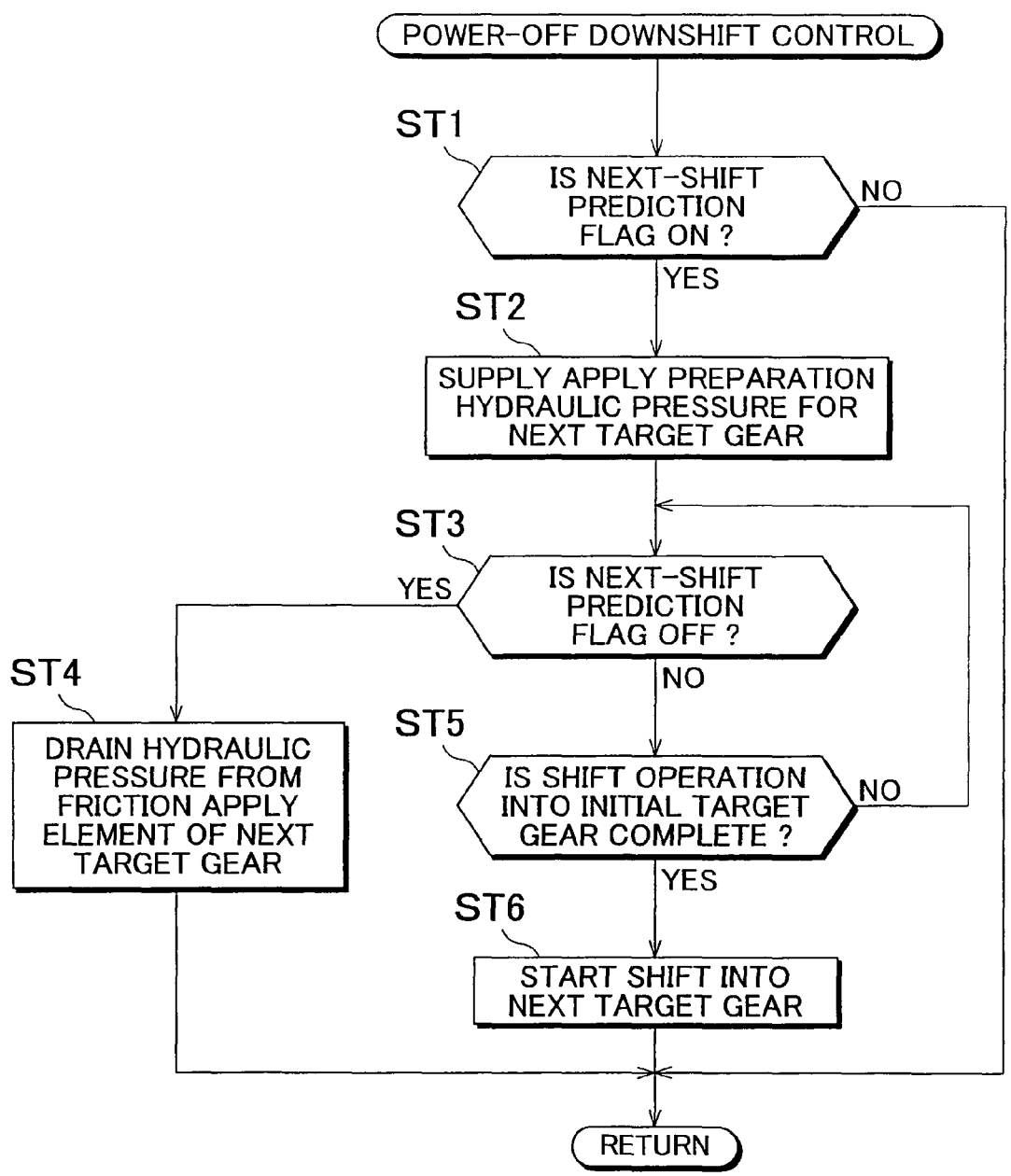
FIG. 10 is a flowchart illustrating a routine for power-off downshift control according to the first example embodiment of the invention.

Hereinafter, this detailed control (i.e., control during a power-off downshift) will be described with reference to the flowchart in FIG. 10. The routine for the control during a power-off downshift shown in FIG. 10 is executed by the transmission control apparatus 4. Also, the routine shown in FIG. 10 is executed at predetermined intervals of time, such as every several msec, after engine startup.

First in step ST1, the transmission control apparatus 4 determines whether a next-shift prediction flag is on. This next-shift prediction flag is a flag for determining whether there will be a demand for a shift into the next target gear (i.e., a demand for a further downshift) while a shift operation from the pre-shift gear into the initial target gear is being performed, by determining whether a power-off downshift is being performed and the vehicle is decelerating relatively rapidly. That is, when it is likely that there will be a demand for a shift into the next target gear, the next-shift prediction flag is turned on and the determination in step ST1 is yes. Two methods for setting the next-shift prediction flag will now be described.

<Next-Shift Prediction Flag Setting Method (1)>

As described above, the next-shift prediction flag is turned on when there is a possibility that there will be a demand for a shift into the next target gear while the shift operation from the pre-shift gear into the initial target gear is being performed. That is, the next-shift prediction flag is turned on when the vehicle is decelerating relatively rapidly and a shift command is output to shift into a continuously lower gear in a relatively short period of time. Therefore, the next-shift prediction flag is switched between on and off based on the deceleration rate of the vehicle.

More specifically, the rate of vehicle deceleration is determined based on signals indicative of, for example, the output value of the G sensor 96, the output value of the vehicle speed sensor 97, the output value of the output shaft rotation speed sensor 93, the sensing value of the brake master cylinder pressure sensor 99, and the output value of the brake pedal sensor 98. That is, the rate of vehicle deceleration is detected using at least one of these signals. When the deceleration rate continues to be larger than a predetermined value for a predetermined period of time (such as 300 msec) or longer, the next-shift prediction flag is turned on. That is, it is determined that there is a possibility that there will be a demand for a shift into the next target gear. The predetermined value of deceleration (i.e., the value obtained based on the detection values from the sensors) and the predetermined period of time in this case are values that are set empirically through testing or the like, but are not limited to the values described above.

<Next-Shift Prediction Flag Setting Method (2)>

The second method for setting the next-shift prediction flag is as follows. First, the vehicle speed at which the hydraulic pressure for the next-shift will start to be supplied (hereinafter simply referred to as "next-shift hydraulic pressure supply start vehicle speed") is obtained. Then this next-shift hydraulic pressure supply start vehicle speed is compared with the current vehicle speed that is obtained by detection using the vehicle speed sensor 97. The next-shift prediction flag is then switched either on or off depending on the comparison results. More specifically, first, the next-shift hydraulic pressure supply start vehicle speed is calculated according to Operational expression (1) below.

Next-shift hydraulic pressure supply start vehicle speed=Coast down vehicle speed on map+(K× Current vehicle deceleration×Time until the pressure increases to piston stroke end pressure) (1)

Here, K is a conversion coefficient and the current vehicle deceleration is obtained from the output value of the G sensor 96, the output value of the vehicle speed sensor 97, the output value of the output shaft rotation speed sensor 93, or the sensing value of the brake master cylinder pressure sensor 99, or the like. Also, the time until the pressure increases to piston stroke end pressure is the time (such as 500 msec) that it takes for apply members such as clutch discs to reach a position just before they come into contact with one another (i.e., a position right before the end of the piston stroke) from the point when the apply hydraulic pressure starts to be supplied when the clutches C1 to C4 and the brakes B1 and B2 are in a released state. That is, even if hydraulic pressure is supplied, the clutches and brakes will not actually reach the state in which they are applied (i.e., they are only in an apply preparation state) during this time.

When it is assumed that the vehicle continues to decelerate from a vehicle speed corresponding to the next target gear that is obtained based on the shift map (hereinafter simply referred to as the "next target gear vehicle speed") during a power-off downshift, the term "next-shift hydraulic pressure supply start vehicle speed" that was calculated in this way is the vehicle speed a predetermined period of time before the vehicle speed reaches the next target gear vehicle speed. The predetermined period of time in this case is the time that it takes for the clutches and brakes that are to be applied when establishing the next target gear to change from a released state to an applied state. That is, when the vehicle deceleration is constant, the next-shift hydraulic pressure supply start vehicle speed is set such that the clutches and brakes are able to be changed from a released state to an applied state by the time the vehicle speed reaches the next target gear vehicle speed from the next-shift hydraulic pressure supply start vehicle speed. Incidentally, the value of the time until the pressure increases to piston stroke end pressure is not limited to the value described above. That is, it may also be determined by the structure of the automatic transmission 2 or the configuration of the hydraulic pressure circuit or the like.

Next, the next target gear vehicle speed that was calculated as described above is compared with the current vehicle speed that is obtained by detection using the vehicle speed sensor 97, and the next-shift prediction flag is switched either on or off depending on the comparison results. For example, the next-shift prediction flag is turned on when the current vehicle speed detected by the vehicle speed sensor 97 changes from being higher than the next target gear vehicle speed that was calculated as described above to being lower than that next target gear vehicle speed.

The next-shift prediction flag may be set according to the methods described above. In this case, only method (1) may be used such that the next-shift prediction flag is switched on or off according to method (1), or only method (2) may be used such that the next-shift prediction flag is switched on or off according to method (2). Also, the next-shift prediction flag may also be made to turn on when the condition for the next-shift prediction flag to be on is satisfied in both of these methods (1) and (2) (i.e., when an "AND" condition is satisfied). Furthermore, the next-shift prediction flag also may be made to turn on when the condition for the next-shift prediction flag to be turned on is satisfied in only one of the two methods (i.e., either method (1) or method (2)) (i.e., when an "OR" condition is satisfied).

When the next-shift prediction has been set according to the foregoing method and is turned on such that the determination in step ST1 is YES, the process then proceeds on to step ST2 in which apply-preparation hydraulic pressure starts to be supplied to the clutches C1 to C4 and brakes B1 and B2 that will be applied in the next shift. That is, even if there has not yet been a demand to shift into the next target gear, the operation to supply apply-preparation hydraulic pressure in preparation for a shift into the next target gear is started to operate the clutches C1 to C4 and brakes B1 and B2 that will be applied in the next target gear toward the apply side. This apply-preparation hydraulic pressure is set as the hydraulic pressure necessary to move the clutches C1 to C4 and brakes B1 and B2 that are to be applied in the next target gear to a position right before they become applied, e.g., to a position right before apply members such as clutch discs come into contact with one another.

After apply-preparation hydraulic pressure has started to be supplied in this manner, the process proceeds on to step ST3 where the transmission control apparatus 4 determines whether the next-shift prediction flag has changed to off, i.e., whether the next-shift prediction flag that was on has been turned off. That is, even if it is determined in step ST1 that the next-shift prediction flag is on, if thereafter the driver releases the brake (i.e., stops depressing the brake pedal) or performs an acceleration operation (i.e., depresses the accelerator pedal), there would no longer be a demand to shift into the next target gear while the shift operation from the pre-shift gear to the initial target gear is being performed (i.e., it is determined that there is no longer a possibility that there will be a demand for a shift into the next target gear). Therefore, this determination is made in order to confirm that the next-shift flag to cancel the supply (i.e., drain) the apply-preparation hydraulic pressure is off.

Then if the next-shift prediction flag has been turned off such that the determination in step ST3 is YES, the process proceeds on to step ST4 where supply of the apply-preparation hydraulic pressure to the clutches and brakes to which the apply-preparation hydraulic pressure was supplied (i.e., the clutches and brakes that were to be applied for the shift into the next target gear) is cancelled (i.e., that apply-preparation hydraulic pressure is drained).

If, on the other hand, it is determined in step ST3 that the next-shift prediction flag is still on (i.e., NO in step ST3), the process proceeds on to step ST5 where the transmission control apparatus 4 determines whether the shift operation into the initial target gear is complete. If it is determined in step ST5 that the shift operation into the initial target gear is not yet complete (i.e., NO in step ST5), the process returns to step S3 and the transmission control apparatus 4 again determines whether the next-shift prediction flag has been turned off. That is, when the determination in step ST3 is no, the next-shift prediction flag is still on so in step ST5 the transmission control apparatus 4 waits for the shift operation into the initial target gear to be completed (i.e., waits for the determination in step ST5 to be yes). If, on the other hand, it is determined in step ST3 that the next-shift prediction flag has been turned off, the supply of apply-preparation hydraulic pressure to the clutches and brakes to which the apply-preparation hydraulic pressure was supplied is cancelled (i.e., that apply-preparation hydraulic pressure is drained) in step ST4, as described above. That is, even if the shift operation into the initial target gear is complete, immediately thereafter it is determined that the shift operation into the next target gear is no longer necessary so the apply-preparation hydraulic pressure is drained such that the clutches and brakes that were operated toward the apply side by that apply-preparation hydraulic pressure are returned to their released states.

If, on the other hand, it is determined in step ST5 that the shift operation into the initial target gear is complete (i.e., YES in step ST5), the process proceeds on to step ST6 where the shift operation into the next target gear is started. In this case, the clutches and brakes to be applied in the next target gear have already been prepared to be applied, i.e., placed in the state immediately preceding the applied state, so the shift operation (i.e., application of the clutches and brakes) into the next target gear can be performed quickly after the shift operation into the initial target gear is complete. Therefore, even if a downshift operation is performed in a plurality of steps, the total shift time can be shortened. As a result, even if a downshift operation is performed in a plurality of steps when the vehicle is decelerating relatively rapidly, for example, a speed appropriate for the vehicle speed can be established so shift shock can be reduced.

Figure 11:
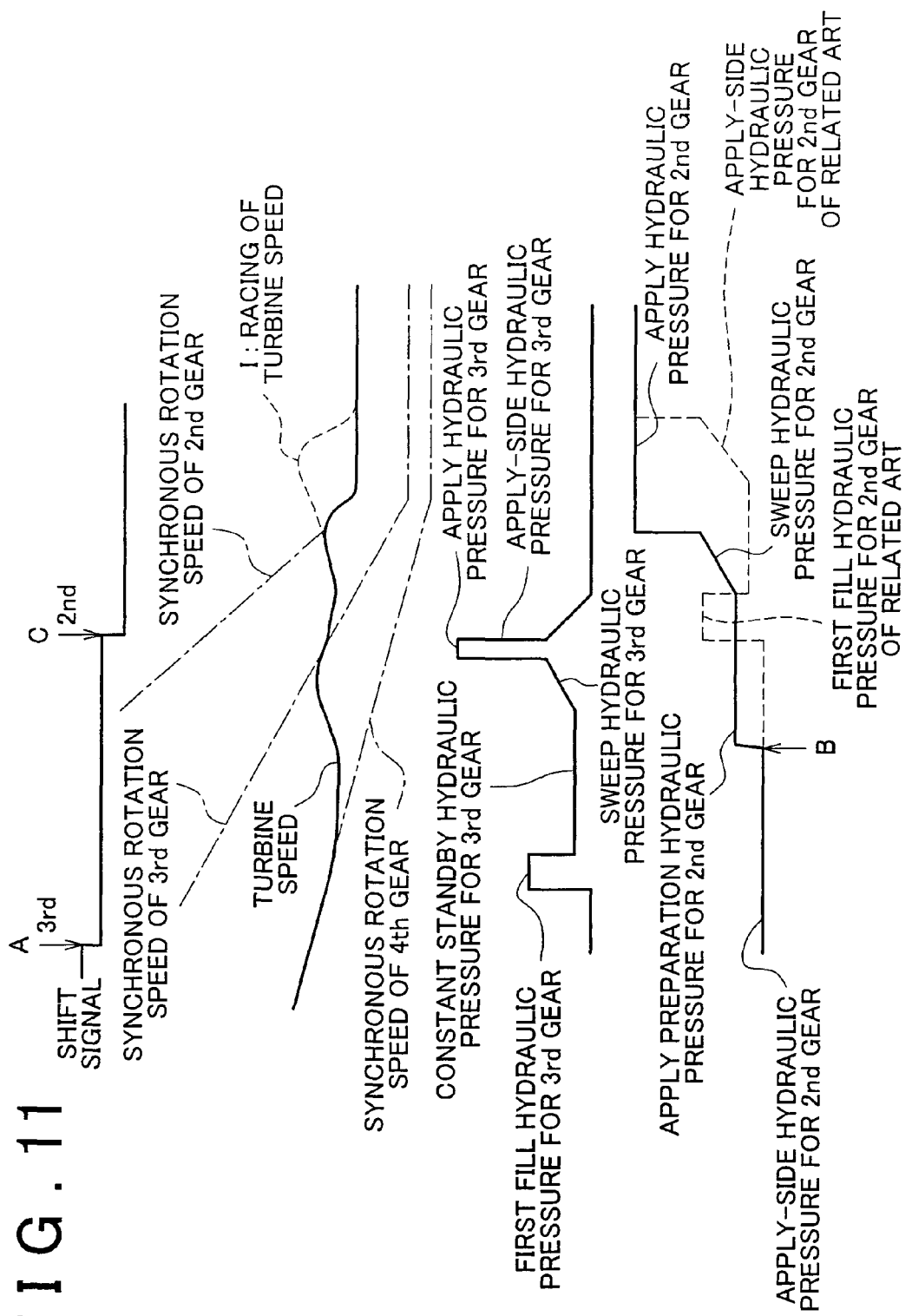
FIG. 11 is a timing chart showing an example of the power-off downshift control according to the first example embodiment of the invention.

FIG. 11 is a timing chart showing an example of the power-off downshift control according to this example embodiment. Also, the example illustrated in FIG. 11 is one in which, during a power-off downshift from 4th gear (which is the pre-shift gear) into 3rd gear (which is the initial target gear), there is a demand for a shift into 2nd gear (i.e., which is the next target gear). From the top down in FIG. 11 are shown changes in the shift signal, the turbine speed (i.e., the rotation speed of the input shaft 9), and the apply-side hydraulic pressure for 3rd gear, and the apply-side hydraulic pressure for 2nd gear. Also, the broken lines in the drawing indicate changes in the turbine speed and the apply-side hydraulic pressure for 2nd gear in an example of related art. Incidentally, the control operation is not limited to being performed during a power-off downshift from 4th gear into 3rd gear. That is, a similar control operation may also be performed during a power-off downshift between other adjacent gears.

As shown in FIG. 11, at timing A in the drawing, a signal for 3rd gear is output according to the shift map (actually a shift map for a power-off downshift), and a shift operation into 3rd gear is started by applying apply-side hydraulic pressure for 3rd gear. Then if the next-shift prediction flag is turned on at timing B, for example, apply-preparation hydraulic pressure starts to be applied as apply-side hydraulic pressure for 2nd gear at timing B. This apply-side hydraulic pressure for 2nd gear that is applied in this case is set to a hydraulic pressure necessary to move the clutches and brakes (brake B1 in this example embodiment) that are to be newly applied in 2nd gear to a position just before they apply, e.g., to a position just before apply members such as clutch discs come into contact with one another, as described above, so that tie-up does not occur.

Then at timing C in the drawing, the shift operation from 3rd gear into 2nd gear is started by increasing the apply-side hydraulic pressure for 2nd gear immediately after it has been determined that 3rd gear is established. That is, the apply-side hydraulic pressure for 2nd gear is increased to a sweep hydraulic pressure for 2nd gear and then to an apply hydraulic pressure for 2nd gear. At this time, as described above, the brake B1 which is to be applied in 2nd gear has already been operated so that it is prepared to apply, i.e., to the state immediately preceding the applied state, so the shift operation into 2nd gear can be performed quickly after 3rd gear is established. In this case, the hydraulic pressure to the clutches and brakes (i.e., actually clutch C3) that were applied in 3rd gear is drained. When this hydraulic pressure is drained, however, the drain hydraulic pressure (i.e., the apply-side hydraulic pressure for 3rd gear) is adjusted according to the change in the apply-side hydraulic pressure for 2nd gear (i.e., a clutch-to-clutch shift operation) to prevent tie-up from occurring.

Incidentally, during sequential shifting in a power-off downshift according to related art shown by the broken lines in FIG. 11, the apply-side hydraulic pressure for 2nd gear (i.e., first fill hydraulic pressure for 2nd gear) was applied from the time the signal for 2nd gear was output after 3rd gear was established. That is, the clutches and brakes to be applied in 2nd gear started to be applied from a completely released state. Therefore, a shift operation is performed into a higher gear (i.e., a gear with a lower reduction gear ratio) than is appropriate for the vehicle speed and the amount of torque multiplication by the torque converter increases as the turbine speed drops with the decrease in vehicle speed. Also, as shown by the broken line I in FIG. 11, an apply operation for 2nd gear is performed when the turbine speed is increased (i.e., is racing), which results in shift shock (i.e., shock that pushes the vehicle forward).

In this example embodiment, as described above, during a shift operation into the initial target gear (i.e., 3rd gear), apply preparation hydraulic pressure for a shift operation into the next target gear (i.e., 2nd gear) is applied so even if a downshift operation is performed in a plurality of steps, the total shift time is able to be shortened. As a result, even if a downshift is performed in a plurality of steps when the vehicle is decelerating relatively rapidly, a gear that is appropriate for the vehicle speed can be established so shift shock can be suppressed.

Next, a second example embodiment of the invention will be described. The foregoing first example embodiment assumes that, during a shift operation during a power-off downshift (i.e., while a shift operation from the pre-shift gear into the initial target gear is being performed), there is a demand to shift into a gear (i.e., the next target gear) that has a larger gear ratio than the gear that is to be established by that shift operation.

Instead of this, the second example embodiment identifies (i.e., through an identifying operation by next-shift identifying means) a demand to shift into the next target gear based on the shift map while a shift operation from the pre-shift gear into the initial target gear is being performed. Also, in this example embodiment as well, even if there is a demand to shift into the next target gear while the shift operation from the pre-shift gear into the initial target gear is being performed, the shift operation (i.e., the apply operation of the clutches and brakes) into the next target gear (i.e., a shift preparation operation by next shift preparing means) starts after the shift operation into the initial target gear is complete. This will now be described in detail.

In this example embodiment, a shift map for a power-off downshift is used as the shift map to identify a demand for a shift into the next target gear, and it is determined whether there is a demand to shift into the next target gear based on the shift map for a power-off downshift. The shift map for a power-off downshift is specifically a map in which the shift lines have been displaced toward the higher vehicle speed side compared with the shift map shown in FIG. 9. This enables the engine brake to be used effectively.

Figure 12:
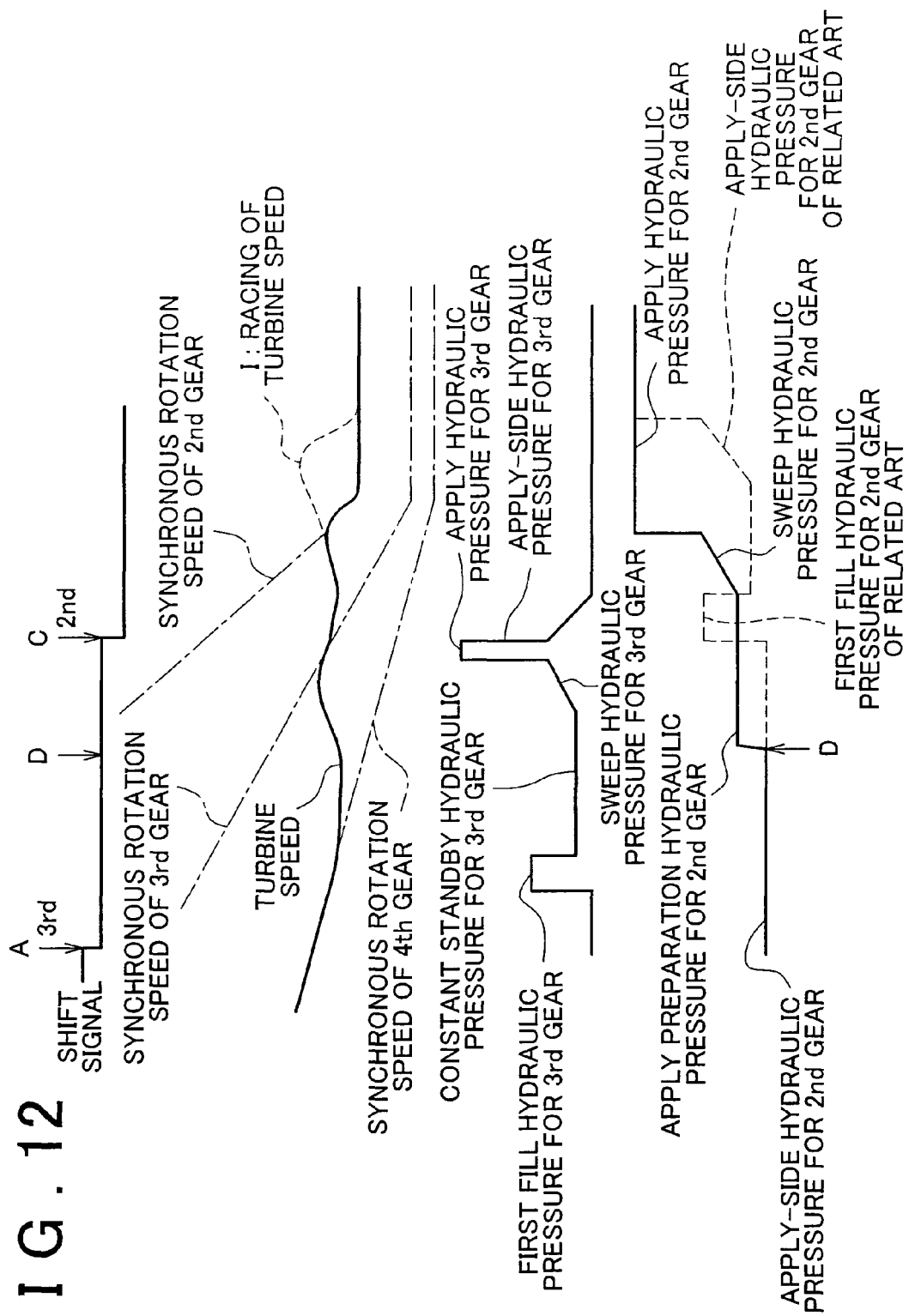
FIG. 12 is a timing chart showing an example of power-off downshift control according to the second example embodiment of the invention.

FIG. 12 is a timing chart showing an example of power-off downshift control according to this example embodiment. Also, FIG. 12 illustrates an example in which there is a demand to shift into 2nd gear (i.e., the next target gear) during a power-off downshift from 4th gear (i.e., the pre-shift gear) into 3rd gear (i.e., the initial target gear), i.e., in which there is a demand to shift into 2nd gear based on the shift map for a power-off downshift. The drawing shows, in order from the top down, changes in the shift signal, the turbine speed (i.e., the rotation speed of the input shaft 9), the apply-side hydraulic pressure for 3rd gear, and the apply-side hydraulic pressure for 2nd gear. Also, the broken lines in the drawing show the changes in the turbine speed and the apply-side hydraulic pressure for 2nd gear according to an example of related art.

As shown in FIG. 12, at timing A in the drawing, a signal for 3rd gear is output according to the shift map and a shift operation into 3rd gear is started by applying the apply-side hydraulic pressure for 3rd gear. Then if the 3→2 shift line in the shift map is crossed such that there is a demand to shift into 2nd gear at timing D, for example, the apply preparation hydraulic pressure starts to be applied as the apply-side hydraulic pressure for 2nd gear at timing D. The apply-side hydraulic pressure for 2nd gear to be applied in this case is set as the hydraulic pressure necessary to move the brake B1 that is to be newly applied in 2nd gear to a position right before it becomes applied, e.g., to a position right before apply members such as clutch discs come into contact with one another, as described above.

Then at timing C in the drawing, a shift operation from 3rd gear into 2nd gear is started by increasing the apply-side hydraulic pressure for 2nd gear immediately after it has been determined that 3rd gear is established. At this time, the brake B1 to be applied in 2nd gear has already been placed in the state immediately preceding the applied state so the shift operation into 2nd gear can be performed quickly after 3rd gear is established, as described above.

In this way, in this example embodiment as well, the apply preparation hydraulic pressure for performing a shift operation into 2nd gear is applied during the shift operation into 3rd gear so the total shift time can be shortened even if the downshift operation is performed in a plurality of steps. As a result, even if a downshift operation is performed in a plurality of steps when the vehicle is decelerating relatively rapidly, for example, a gear appropriate for the vehicle speed can be established so shift shock can be suppressed.

Next, a third example embodiment of the invention will be described. In the foregoing first example embodiment, a shift operation during a power-off downshift is such that, even if there is a demand to shift into the next target gear while a shift operation is being performed from the pre-shift gear into the initial target gear, the shift operation (i.e., the apply operation of the clutches and brakes) into the next target gear is started after the shift operation into the initial target gear is complete.

Instead of this, the third example embodiment is such that when the supply of predetermined apply preparation hydraulic pressure according to an apply preparation hydraulic pressure supply operation to prepare for a shift into the next target gear is complete before the shift operation from the pre-shift gear into the initial target gear is complete, an apply operation of the clutches and brakes to be applied in the next target gear is started without waiting for the shift operation into the initial target gear to be completed.

Figure 13:
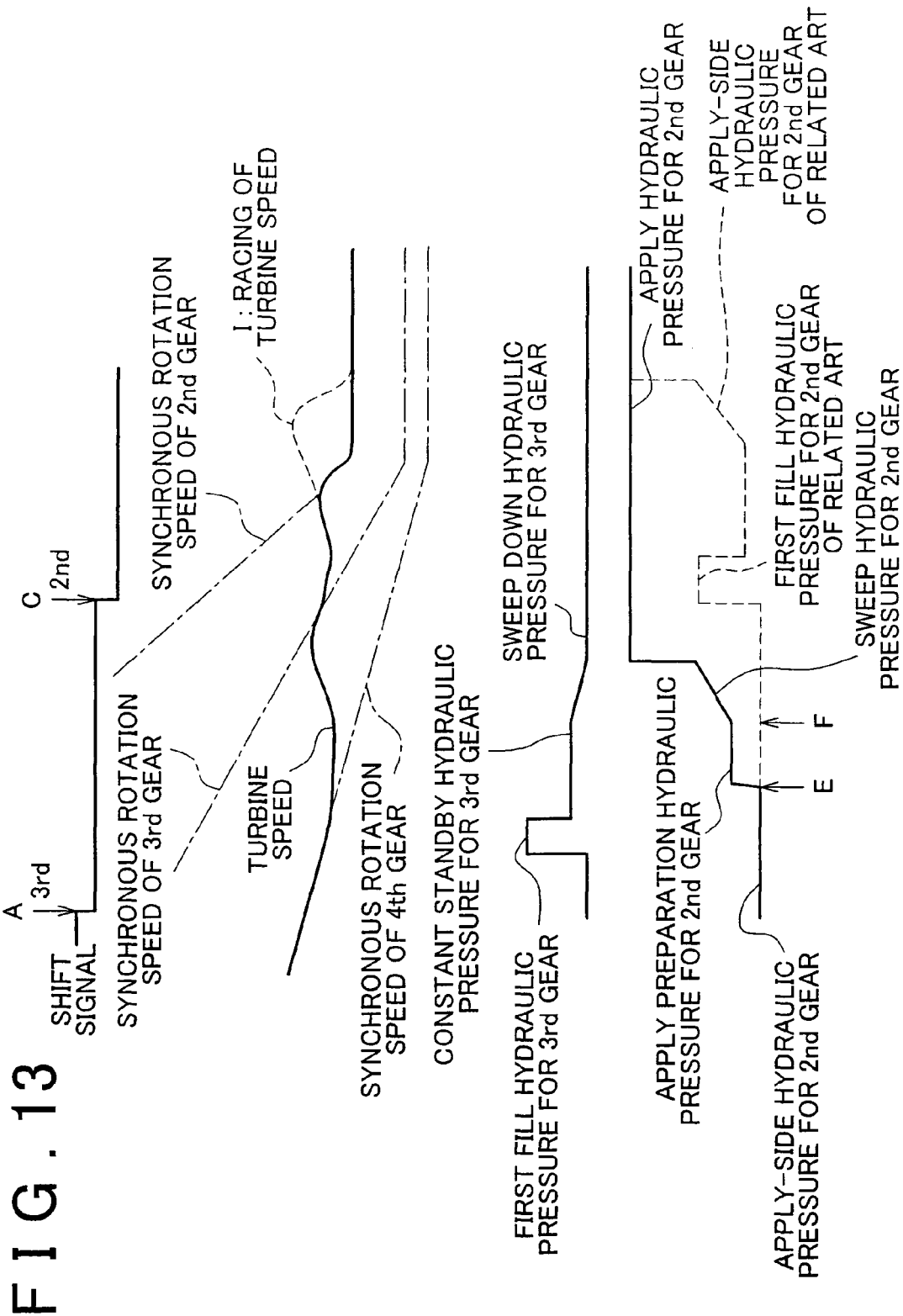
FIG. 13 is a timing chart showing an example of power-off downshift control according to the third example embodiment of the invention.

FIG. 13 is timing chart showing an example of power-off downshift control according to this example embodiment. Also, the example shown in FIG. 13 is also one in which there is a demand to shift into 2nd gear (i.e., the next target gear) during a power-off downshift from 4th gear (i.e., the pre-shift gear) into 3rd gear (i.e., the initial target gear). From the top down in FIG. 13 are shown changes in the shift signal, the turbine speed (i.e., the rotation speed of the input shaft 9), and the apply-side hydraulic pressure for 3rd gear, and the apply-side hydraulic pressure for 2nd gear. Also, the broken lines in the drawing indicate changes in the turbine speed and the apply-side hydraulic pressure for 2nd gear in an example of related art.

As shown in FIG. 13, at timing A in the drawing, a signal for 3rd gear is output according to the shift map, and a shift operation into 3rd gear is started by applying apply-side hydraulic pressure for 3rd gear. Then if the next-shift prediction flag is turned on at timing E, for example, apply-preparation hydraulic pressure starts to be applied as apply-side hydraulic pressure for 2nd gear at timing B. This apply-side hydraulic pressure for 2nd gear that is applied in this case is set to a hydraulic pressure necessary to move the brake B1 that is to be applied in 2nd gear to a position just before it applies, e.g., to a position just before apply members such as clutch discs come into contact with one another, as described above.

The apply operation of the brake B1 to be applied in 2nd gear starts without waiting for the shift operation into 3rd gear to be completed when there is a demand to shift into 2nd gear while a shift operation is being performed from 4th gear into 3rd gear (i.e., at timing F in the drawing, for example), and there is sufficient apply preparation hydraulic pressure, i.e., right before the brake B1 which is to be applied in 2nd gear becomes applied, e.g., when the apply members such as clutch discs have reached a position just before they come into contact with one another. In this case, the apply-side hydraulic pressure for 3rd gear is swept down simultaneously with the start of the apply operation into 2nd gear (i.e., at timing F in the drawing).

In this way, in this example embodiment, a shift operation resembling a skip shift is performed as a shift operation of the automatic transmission 2 while having the shift control operation in response to a shift command be that for sequential shifting. Despite the fact that this shift operation resembles a skip shift, the shift operation into the next target gear is performed after the operation to supply apply preparation hydraulic pressure, which was supplied in advance in preparation for a shift, is complete. Accordingly, a downshift can be performed by skipping over gears without causing a delay in the apply operation of friction apply elements that occurs in a skip shift according to the related art. As a result, drivability can be improved by the suppression of shift shock, while a shift operation into the next target gear can be performed quickly.

Incidentally, in this example embodiment, if there is insufficient apply preparation hydraulic pressure at the time of a demand for a shift into 2nd gear, then the apply operation of the brake B1 that is to be applied in 2nd gear is not started until there is enough apply preparation hydraulic pressure, i.e., until the brake B1 that is to be applied in 2nd gear reaches the position just before it becomes applied.

Also, the control operation to start the apply operation of the clutches and brakes to be applied in the next target gear can also be applied to the second example embodiment described above (in which a demand to shift into the next target gear is identified based on the shift map), without waiting for the shift operation into the initial target gear to be completed as described in this example embodiment.

The foregoing example embodiments describe examples in which the invention is applied to control of the automatic transmission 2 having eight forward gears (i.e., a forward eight-speed automatic transmission), but the invention is not limited to this. For example, the invention can also be applied to hydraulic control of a planetary gear type automatic transmission having any number of gears (i.e., speeds).

Also, the foregoing example embodiments describe examples in which shift control is executed by obtaining the appropriate gear based on the vehicle speed and the accelerator operation amount. However, the invention is not limited to this. For example, shift control may also be executed by obtaining the appropriate gear based on the vehicle speed and the throttle opening amount.

Further, the engine mounted in the vehicle to which the invention can be applied may be a gasoline engine or a diesel engine.

Also, the operation to supply the apply preparation hydraulic pressure for the next target gear in the foregoing example embodiments can also be executed during a downshift operation in the sequential mode. That is, considering that a downshift operation into the next gear speed may also be performed while the driver is performing a downshift operation with the power off (i.e., while the engine is being driven by the driving wheels) and a shift operation from the pre-shift gear into the initial target gear is being performed, the operation to supply the apply preparation hydraulic pressure in preparation for the shift into the next target gear is started when the shift operation from the pre-shift gear into the initial target gear is performed.

Also, in the foregoing example embodiments, when a shift operation from the pre-shift gear into the initial target gear is being performed, an operation to supply apply preparation hydraulic pressure in preparation for a shift into the next target gear which is one gear lower than the initial target gear is started. In addition to this, an operation to supply apply preparation hydraulic pressure in preparation for a shift into a still lower gear (i.e., the next-next target gear) may also be started simultaneously. For example, during a power-off downshift from 5th gear to 4th gear, apply preparation hydraulic pressure in order to perform a shift operation into 3rd gear may be applied while simultaneously applying apply preparation hydraulic pressure in order to perform a shift operation into 2nd gear.

Moreover, the invention is not limited to a case in which there is a demand to shift into the next target gear during a shift operation. That is, the invention also includes the concept of starting an operation to supply apply preparation hydraulic pressure in preparation for a shift when the timing at which there will be a demand for a shift is estimated or identified, or when a shift demand has been estimated or identified, when the engine is being driven by the driving wheels (i.e., in a power-off state) and a shift operation is not being performed.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A hydraulic control apparatus of an automatic transmission which is provided with a plurality of friction apply elements and in which a gear ratio is established by selectively applying the plurality of friction apply elements by controlling hydraulic pressure with respect to the plurality of friction apply elements, comprising:

a next-shift estimating device that estimates whether there is a possibility that, during a shift operation during a power-off downshift, there will be a demand for a shift into a second predetermined gear which has a larger gear ratio than a first predetermined gear that is to be established by this shift operation; and a next-shift preparing device that, when it is estimated by the next-shift estimating device that there is the possibility that there will be the demand for the shift into the second predetermined gear, starts an operation for supplying an apply preparation hydraulic pressure in preparation for the shift into the second predetermined gear, with respect to the friction apply element that will be applied in the second predetermined gear for which there is the possibility that there will be the demand for the shift thereinto and placing this friction apply element in a state right before the applied state, while continuing that shift operation, wherein when there is the demand for the shift into the second predetermined gear, an operation for applying the friction apply element that has been placed in the state right before the applied state is started.

2. The hydraulic control apparatus according to claim 1, wherein the next-shift estimating device estimates that there is a possibility that there will be a demand for the shift into the second predetermined gear when a vehicle continues to decelerate at a rate faster than a predetermined deceleration rate for a predetermined period of time.

3. The hydraulic control apparatus according to claim 1, wherein the next-shift estimating device estimates that there is a possibility that there will be a demand for the shift into the second predetermined gear when a vehicle speed of a vehicle changes from being higher than a next shift hydraulic pressure supply start vehicle speed that is set in advance to being lower than that next shift hydraulic pressure supply start vehicle speed.

4. The hydraulic control apparatus according to claim 3, wherein when it is assumed that the vehicle will continue to decelerate from a second predetermined gear vehicle speed that corresponds to the second predetermined gear during a power-off downshift, the next shift hydraulic pressure supply start vehicle speed is set to be the vehicle speed a predetermined period of time before the vehicle speed of the vehicle reaches the second predetermined gear vehicle speed, the predetermined period of time being a time that it takes for a friction apply element that is to be applied when establishing the second predetermined gear to change from a released state to an applied state.

5. The hydraulic control apparatus according to claim 1, wherein the next-shift preparing device starts an operation for supplying an apply preparation hydraulic pressure in preparation for a shift into a third predetermined gear which has a larger gear ratio than the second predetermined gear with respect to a friction apply element that will be applied in the third predetermined gear, at substantially the same time as a time at which the operation for supplying the apply preparation hydraulic pressure in preparation for the shift into the second predetermined gear starts with respect to the friction apply element that will be applied in the second predetermined gear.

6. A hydraulic control apparatus of an automatic transmission which is provided with a plurality of friction apply elements and in which a gear ratio is established by selectively applying the plurality of friction apply elements by controlling hydraulic pressure with respect to the plurality of friction apply elements, comprising:

a next-shift estimating device that estimates whether there is a possibility that, during power-off, there will be a demand for a shift into a second predetermined gear which has a larger gear ratio than a first predetermined gear which is the current gear of the automatic transmission; and a next-shift preparing device that, when it is estimated by the next-shift estimating device that there is the possibility that there will be the demand for the shift into the second predetermined gear, starts an operation for supplying an apply preparation hydraulic pressure in preparation for the shift into the second predetermined gear, with respect to the friction apply element that will be applied in the second predetermined gear for which there is the possibility that there will be the demand for the shift thereinto and placing this friction apply element in a state right before the applied state, wherein when there is the demand for the shift into the second predetermined gear, an operation for applying the friction apply element that has been placed in the state right before the applied state is started.

7. The hydraulic control apparatus according to claim 6, wherein the next-shift estimating device estimates that there is a possibility that there will be a demand for the shift into the second predetermined gear when a vehicle continues to decelerate at a rate faster than a predetermined deceleration rate for a predetermined period of time.

8. The hydraulic control apparatus according to claim 6, wherein the next-shift estimating device estimates that there is a possibility that there will be a demand for the shift into the second predetermined gear when a vehicle speed of a vehicle changes from being higher than a next shift hydraulic pressure supply start vehicle speed that is set in advance to being lower than that next shift hydraulic pressure supply start vehicle speed.

9. A hydraulic control apparatus of an automatic transmission in which a gear ratio is changed by selectively applying a plurality of friction apply elements by controlling hydraulic pressure with respect to the plurality of friction apply elements, comprising:

a next-shift estimating device that estimates whether there is a possibility that, during a shift operation during a power-off downshift, there will be a demand for a shift into a second predetermined gear which has a larger gear ratio than a first predetermined gear that is to be established by this shift operation; and a next-shift preparing device that, when it is estimated by the next-shift estimating device that there is the possibility that there will be the demand for the shift into the second predetermined gear, starts an operation for supplying an apply preparation hydraulic pressure in preparation for a shift, with respect to the friction apply element that will be applied in the second predetermined gear for which there is the possibility that there will be the demand for the shift thereinto and placing this friction apply element in a state right before the applied state, while continuing the shift operation, wherein when there is the demand for the shift into the second predetermined gear, an operation for applying the friction apply element that has been placed in the state right before the applied state is started after the shift operation into a gear into which the shift operation is performed is complete.

10. The hydraulic control apparatus according to claim 9, wherein the next-shift estimating device estimates that there is a possibility that there will be a demand for the shift into the second predetermined gear when a vehicle continues to decelerate at a rate faster than a predetermined deceleration rate for a predetermined period of time.

11. The hydraulic control apparatus according to claim 9, wherein the next-shift estimating device estimates that there is a possibility that there will be a demand for the shift into the second predetermined gear when a vehicle speed of a vehicle changes from being higher than a next shift hydraulic pressure supply start vehicle speed that is set in advance to being lower than that next shift hydraulic pressure supply start vehicle speed.

12. The hydraulic control apparatus according to claim 9, wherein the apply preparation hydraulic pressure in preparation for the shift into the second predetermined gear is drained when the next-shift estimating device no longer estimates that there is a possibility that there will be a demand for the shift into the second predetermined gear before completion of the shift operation into a gear into which the shift operation is being performed at a time point at which the operation for supplying the apply preparation hydraulic pressure is started.

13. A hydraulic control apparatus of an automatic transmission in which a gear ratio is changed by selectively applying a plurality of friction apply elements by controlling hydraulic pressure with respect to the plurality of friction apply elements, comprising:

a next-shift estimating device that estimates whether there is a possibility that, during power-off, there will be a demand for a shift into a second predetermined gear which has a larger gear ratio than a first predetermined gear which is the current gear of the automatic transmission; and a next-shift preparing device that, when it is estimated by the next-shift estimating device that there is the possibility that there will be the demand for the shift into the second predetermined gear, starts an operation for supplying an apply preparation hydraulic pressure in preparation for a shift, with respect to the friction apply element that will be applied in the second predetermined gear for which there is the possibility that there will be the demand for the shift thereinto and placing this friction apply element in a state right before the applied state, wherein when the operation for supplying the apply preparation hydraulic pressure in preparation for a shift is started while a shift operation is performed, and there is the demand for the shift into the second predetermined gear, an operation for applying the friction apply element that has been placed in the state right before the applied state is started after the shift operation is complete.

14. The hydraulic control apparatus according to claim 13, wherein the next-shift estimating device estimates that there is a possibility that there will be a demand for the shift into the second predetermined gear when a vehicle continues to decelerate at a rate faster than a predetermined deceleration rate for a predetermined period of time.

15. The hydraulic control apparatus according to claim 13, wherein the next-shift estimating device estimates that there is a possibility that there will be a demand for the shift into the second predetermined gear when a vehicle speed of a vehicle changes from being higher than a next shift hydraulic pressure supply start vehicle speed that is set in advance to being lower than that next shift hydraulic pressure supply start vehicle speed.

16. The hydraulic control apparatus according to claim 13, wherein the apply preparation hydraulic pressure in preparation for the shift into the second predetermined gear is drained when the next-shift estimating device no longer estimates that there is a possibility that there will be a demand for the shift into the second predetermined gear before completion of the shift operation into a gear into which the shift operation is being performed at a time point at which the operation for supplying the apply preparation hydraulic pressure is started.

17. A hydraulic control apparatus of an automatic transmission in which a gear ratio is changed by selectively applying a plurality of friction apply elements by controlling hydraulic pressure with respect to the plurality of friction apply elements, comprising:

a next-shift estimating device that estimates whether there is a possibility that, during a shift operation during a power-off downshift, there will be a demand for a shift into a second predetermined gear which has a larger gear ratio than a first predetermined gear that is to be established by this shift operation; and a next-shift preparing device that, when it is estimated by the next-shift estimating device that there is the possibility that there will be the demand for the shift into the second predetermined gear, starts an operation for supplying an apply preparation hydraulic pressure in preparation for a shift, with respect to the friction apply element that will be applied in the second predetermined gear for which there is the possibility that there will be the demand for the shift thereinto and placing this friction apply element in a state right before the applied state, while continuing the shift operation, wherein when there is the demand for the shift into the second predetermined gear, an operation for applying the friction apply element that is to be applied in the second predetermined gear is started without waiting until the shift operation is complete, when supply of a predetermined apply preparation hydraulic pressure according to the operation for supplying the apply preparation hydraulic pressure in preparation for the shift into the second predetermined gear is complete before completion of the shift operation into a gear into which the shift operation is being performed at a time point at which the operation for supplying the apply preparation hydraulic pressure is started.

18. The hydraulic control apparatus according to claim 17, wherein the next-shift estimating device estimates that there is a possibility that there will be a demand for the shift into the second predetermined gear when a vehicle continues to decelerate at a rate faster than a predetermined deceleration rate for a predetermined period of time.

19. The hydraulic control apparatus according to claim 17, wherein the next-shift estimating device estimates that there is a possibility that there will be a demand for the shift into the second, predetermined gear when a vehicle speed of a vehicle changes from being higher than a next shift hydraulic pressure supply start vehicle speed that is set in advance to being lower than that next shift hydraulic pressure supply start vehicle speed.

* * * * *